(12) United States Patent
Coneski et al.

(10) Patent No.: US 8,621,112 B2
(45) Date of Patent: Dec. 31, 2013

(54) DISCOVERY BY OPERATING SYSTEM OF INFORMATION RELATING TO ADAPTER FUNCTIONS ACCESSIBLE TO THE OPERATING SYSTEM

(75) Inventors: Anthony F. Coneski, Newburgh, NY (US); David Craddock, New Paltz, NY (US); Charles W. Gainey, Jr., Poughkeepsie, NY (US); Beth A. Glendening, Poughkeepsie, NY (US); Thomas A. Gregg, Highland, NY (US); Ugochukwu C. Njoku, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 12/821,185

(22) Filed: Jun. 23, 2010

(65) Prior Publication Data

US 2011/0320637 A1   Dec. 29, 2011

(51) Int. Cl.
*G06F 3/00* (2006.01)
*G06F 13/12* (2006.01)

(52) U.S. Cl.
CPC ................... *G06F 13/126* (2013.01)
USPC ........................................................... 710/5

(58) Field of Classification Search
USPC ............................................................ 710/5
See application file for complete search history.

(56) References Cited

U.S. PATENT DOCUMENTS

| | | |
|---|---|---|
| 3,976,979 A | 8/1976 | Parkinson et al. |
| 4,271,468 A | 6/1981 | Christensen et al. |
| 4,323,963 A | 4/1982 | Wu |
| 5,053,952 A | 10/1991 | Koopman, Jr. et al. |
| 5,170,472 A | 12/1992 | Cwiakala et al. |
| 5,265,240 A | 11/1993 | Galbraith et al. |
| 5,282,274 A | 1/1994 | Liu |
| 5,430,856 A | 7/1995 | Kinoshita |
| 5,465,332 A | 11/1995 | Deloye et al. |

(Continued)

FOREIGN PATENT DOCUMENTS

| | | |
|---|---|---|
| EP | 0076921 A2 | 4/1983 |
| EP | 0552873 A1 | 7/1993 |

(Continued)

OTHER PUBLICATIONS

PCI device access under 32-bit PM DOS from Open Watcom; [online], internet archive date Jul. 19, 2006; retreived May 26, 2012, <URL: http://www.openwatcom.org/index.php/PCI_Device_access_under_32-Bit_PM_DOS>.*

(Continued)

*Primary Examiner* — Henry Tsai
*Assistant Examiner* — Eric Oberly
(74) *Attorney, Agent, or Firm* — John E. Campbell; Blanche E. Schiller, Esq.; Heslin Rothenberg Farley & Mesiti P.C.

(57) ABSTRACT

A tiered discovery capability is employed to obtain attributes regarding adapters of an I/O configuration. The first tier obtains a list of the adapter functions accessible to an operating system; the second tier obtains attributes regarding a selected adapter function of the list of adapter functions; and a third tier obtains common attributes of a group of adapter functions, the group including the selected adapter function.

23 Claims, 16 Drawing Sheets

(56) References Cited

U.S. PATENT DOCUMENTS

| | | | |
|---|---|---|---|
| 5,465,355 A | 11/1995 | Cook et al. |
| 5,535,352 A | 7/1996 | Bridges et al. |
| 5,551,013 A | 8/1996 | Beausoleil et al. |
| 5,574,873 A | 11/1996 | Davidian |
| 5,586,268 A | 12/1996 | Chen et al. |
| 5,600,805 A | 2/1997 | Fredericks et al. |
| 5,617,554 A | 4/1997 | Alpert et al. |
| 5,742,785 A | 4/1998 | Stone et al. |
| 5,761,448 A | 6/1998 | Adamson et al. |
| 5,790,825 A | 8/1998 | Traut |
| 5,802,590 A | 9/1998 | Draves |
| 5,819,053 A | 10/1998 | Goodrum et al. |
| 5,822,616 A | 10/1998 | Hirooka |
| 5,826,084 A | 10/1998 | Brooks et al. |
| 5,838,960 A | 11/1998 | Harriman, Jr. |
| 5,870,598 A | 2/1999 | White et al. |
| 5,875,343 A | 2/1999 | Binford et al. |
| 5,875,463 A | 2/1999 | Crump et al. |
| 5,901,312 A | 5/1999 | Radko |
| 5,960,213 A | 9/1999 | Wilson |
| 5,974,440 A | 10/1999 | Brooks et al. |
| 5,995,745 A | 11/1999 | Yodaiken |
| 6,009,261 A | 12/1999 | Scalzi et al. |
| 6,023,736 A | 2/2000 | Lambeth et al. |
| 6,067,595 A | 5/2000 | Lindenstruth |
| 6,078,970 A | 6/2000 | Nordstrom et al. |
| 6,205,530 B1 | 3/2001 | Kang |
| 6,308,255 B1 | 10/2001 | Gorishek, IV et al. |
| 6,330,647 B1 | 12/2001 | Jeddeloh et al. |
| 6,330,656 B1 | 12/2001 | Bealkowski et al. |
| 6,349,380 B1 | 2/2002 | Shahidzadeh et al. |
| 6,397,350 B1 | 5/2002 | Baskey et al. |
| 6,408,347 B1 | 6/2002 | Smith et al. |
| 6,463,582 B1 | 10/2002 | Lethin et al. |
| 6,493,741 B1 | 12/2002 | Emer et al. |
| 6,519,645 B2 | 2/2003 | Markos et al. |
| 6,529,978 B1 | 3/2003 | Eide et al. |
| 6,557,035 B1* | 4/2003 | McKnight | 709/224 |
| 6,578,191 B1 | 6/2003 | Boehme et al. |
| 6,581,130 B1 | 6/2003 | Brinkmann, Jr. et al. |
| 6,615,305 B1 | 9/2003 | Olesen et al. |
| 6,629,175 B1 | 9/2003 | Manning et al. |
| 6,654,818 B1 | 11/2003 | Thurber |
| 6,658,521 B1 | 12/2003 | Biran et al. |
| 6,704,831 B1 | 3/2004 | Avery |
| 6,715,011 B1 | 3/2004 | Buckland et al. |
| 6,721,839 B1 | 4/2004 | Bauman et al. |
| 6,772,097 B1 | 8/2004 | Kromenaker et al. |
| 6,772,264 B1 | 8/2004 | Dayan et al. |
| 6,792,492 B1 | 9/2004 | Griffin |
| 6,820,164 B2 | 11/2004 | Holm et al. |
| 6,901,537 B2 | 5/2005 | Dawkins et al. |
| 6,907,510 B2 | 6/2005 | Bennett et al. |
| 6,963,940 B1 | 11/2005 | Glassen et al. |
| 6,968,446 B1* | 11/2005 | McGrath | 712/229 |
| 6,970,992 B2 | 11/2005 | Gurumoorthy et al. |
| 6,978,338 B2 | 12/2005 | Wang et al. |
| 6,996,638 B2 | 2/2006 | Brice, Jr. et al. |
| 7,065,598 B2 | 6/2006 | Connor et al. |
| 7,107,384 B1 | 9/2006 | Chen et al. |
| 7,127,599 B2 | 10/2006 | Brice, Jr. et al. |
| 7,130,938 B2 | 10/2006 | Brice, Jr. et al. |
| 7,139,940 B2 | 11/2006 | Arbeitman et al. |
| 7,174,550 B2 | 2/2007 | Brice, Jr. et al. |
| 7,177,961 B2 | 2/2007 | Brice, Jr. et al. |
| 7,200,704 B2 | 4/2007 | Njoku et al. |
| 7,209,994 B1 | 4/2007 | Klaiber et al. |
| 7,225,287 B2 | 5/2007 | Wooten |
| 7,260,664 B2 | 8/2007 | Arndt et al. |
| 7,277,968 B2 | 10/2007 | Brice, Jr. et al. |
| 7,296,120 B2 | 11/2007 | Corrigan et al. |
| 7,302,692 B2 | 11/2007 | Bae et al. |
| 7,328,296 B1 | 2/2008 | Marmash et al. |
| 7,334,107 B2 | 2/2008 | Schoinas et al. |
| 7,340,582 B2 | 3/2008 | Madukkarumukumana |
| 7,380,041 B2 | 5/2008 | Belmar et al. |
| 7,398,343 B1 | 7/2008 | Marmash et al. |
| 7,412,488 B2 | 8/2008 | Jha et al. |
| 7,418,572 B2 | 8/2008 | Hepkin |
| 7,420,931 B2 | 9/2008 | Nanda et al. |
| 7,444,493 B2 | 10/2008 | Schoinas et al. |
| 7,454,548 B2 | 11/2008 | Belmar et al. |
| 7,464,191 B2 | 12/2008 | Arndt et al. |
| 7,475,183 B2 | 1/2009 | Traut et al. |
| 7,493,425 B2 | 2/2009 | Arndt et al. |
| 7,496,706 B2 | 2/2009 | Nguyen et al. |
| 7,496,707 B2 | 2/2009 | Freking et al. |
| 7,502,872 B2 | 3/2009 | Boyd et al. |
| 7,506,087 B2 | 3/2009 | Ho et al. |
| 7,509,391 B1 | 3/2009 | Chauvel et al. |
| 7,516,252 B2 | 4/2009 | Krithivas |
| 7,526,592 B2 | 4/2009 | Tsuruta |
| 7,529,860 B2 | 5/2009 | Freimuth et al. |
| 7,530,071 B2 | 5/2009 | Billau et al. |
| 7,546,406 B2 | 6/2009 | Armstrong et al. |
| 7,546,487 B2 | 6/2009 | Marisetty et al. |
| 7,549,090 B2 | 6/2009 | Bailey et al. |
| 7,552,298 B2 | 6/2009 | Bestler |
| 7,562,366 B2 | 7/2009 | Pope et al. |
| 7,567,567 B2 | 7/2009 | Muller et al. |
| 7,587,531 B2 | 9/2009 | Brice, Jr. et al. |
| 7,600,053 B2 | 10/2009 | Carlson et al. |
| 7,606,965 B2 | 10/2009 | Njoku et al. |
| 7,613,847 B2 | 11/2009 | Kjos et al. |
| 7,617,340 B2 | 11/2009 | Gregg |
| 7,617,345 B2 | 11/2009 | Clark et al. |
| 7,623,460 B2 | 11/2009 | Miyazaki |
| 7,624,235 B2 | 11/2009 | Wadhawan et al. |
| 7,627,723 B1 | 12/2009 | Buck et al. |
| 7,631,097 B2 | 12/2009 | Moch et al. |
| 7,886,086 B2* | 2/2011 | Sharma et al. | 710/29 |
| 8,112,556 B2 | 2/2012 | Hanson et al. |
| 8,504,754 B2 | 8/2013 | Craddock et al. |
| 2001/0021971 A1 | 9/2001 | Gibson et al. |
| 2002/0152334 A1* | 10/2002 | Holm et al. | 710/2 |
| 2002/0161907 A1 | 10/2002 | Moon |
| 2003/0056155 A1 | 3/2003 | Austen et al. |
| 2003/0074541 A1 | 4/2003 | Plambeck |
| 2004/0015622 A1 | 1/2004 | Avery |
| 2004/0025166 A1 | 2/2004 | Adlung et al. |
| 2004/0049600 A1 | 3/2004 | Boyd et al. |
| 2004/0064618 A1 | 4/2004 | Farrell et al. |
| 2004/0073905 A1 | 4/2004 | Emer et al. |
| 2004/0093452 A1 | 5/2004 | Easton et al. |
| 2004/0117534 A1 | 6/2004 | Parry et al. |
| 2004/0122988 A1 | 6/2004 | Han |
| 2004/0139304 A1 | 7/2004 | Arimilli et al. |
| 2004/0139305 A1 | 7/2004 | Arimilli et al. |
| 2004/0199700 A1 | 10/2004 | Clayton |
| 2004/0236880 A1 | 11/2004 | Barrett |
| 2005/0033895 A1 | 2/2005 | Lueck et al. |
| 2005/0071472 A1 | 3/2005 | Arndt et al. |
| 2005/0114586 A1* | 5/2005 | Brice et al. | 711/1 |
| 2005/0114623 A1 | 5/2005 | Craddock et al. |
| 2005/0289271 A1 | 12/2005 | Martinez et al. |
| 2006/0005083 A1 | 1/2006 | Genden et al. |
| 2006/0064618 A1 | 3/2006 | Wu et al. |
| 2006/0101181 A1 | 5/2006 | Post et al. |
| 2006/0130071 A1 | 6/2006 | Martin et al. |
| 2006/0195617 A1 | 8/2006 | Arndt et al. |
| 2006/0195644 A1 | 8/2006 | Arndt et al. |
| 2006/0230208 A1 | 10/2006 | Gregg et al. |
| 2006/0253619 A1 | 11/2006 | Torudbakken et al. |
| 2006/0288130 A1 | 12/2006 | Madukkarumukumana et al. |
| 2007/0028087 A1 | 2/2007 | Yu et al. |
| 2007/0073955 A1 | 3/2007 | Murray et al. |
| 2007/0136554 A1 | 6/2007 | Biran et al. |
| 2007/0168636 A1 | 7/2007 | Hummel et al. |
| 2007/0168643 A1 | 7/2007 | Hummel et al. |
| 2007/0168644 A1 | 7/2007 | Hummel et al. |
| 2007/0168934 A1 | 7/2007 | Chandrasekharan et al. |
| 2007/0186074 A1 | 8/2007 | Bradford et al. |
| 2007/0226386 A1 | 9/2007 | Sharp et al. |
| 2007/0234018 A1 | 10/2007 | Feiste |

(56) References Cited

U.S. PATENT DOCUMENTS

| | | |
|---|---|---|
| 2007/0245041 A1 | 10/2007 | Hua et al. |
| 2007/0260768 A1 | 11/2007 | Bender et al. |
| 2007/0271559 A1 | 11/2007 | Easton et al. |
| 2008/0091851 A1 | 4/2008 | Sierra |
| 2008/0091868 A1 | 4/2008 | Mizrachi et al. |
| 2008/0091915 A1 | 4/2008 | Moertl et al. |
| 2008/0098197 A1 | 4/2008 | Craddock et al. |
| 2008/0114734 A1 | 5/2008 | Suwabe |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0148295 A1 | 6/2008 | Freimuth et al. |
| 2008/0168208 A1 | 7/2008 | Gregg |
| 2008/0222406 A1 | 9/2008 | Tabuchi |
| 2008/0235425 A1 | 9/2008 | Belmar et al. |
| 2009/0024823 A1 | 1/2009 | Ko et al. |
| 2009/0049220 A1 | 2/2009 | Conti et al. |
| 2009/0070760 A1 | 3/2009 | Khatri et al. |
| 2009/0089780 A1 | 4/2009 | Johnson et al. |
| 2009/0125666 A1 | 5/2009 | Freking et al. |
| 2009/0144462 A1 | 6/2009 | Arndt et al. |
| 2009/0144731 A1 | 6/2009 | Brown et al. |
| 2009/0172211 A1 | 7/2009 | Perry et al. |
| 2009/0182966 A1 | 7/2009 | Greiner et al. |
| 2009/0182969 A1 | 7/2009 | Norgaard et al. |
| 2009/0210646 A1 | 8/2009 | Bauman et al. |
| 2009/0222814 A1 | 9/2009 | Astrand |
| 2009/0240849 A1 | 9/2009 | Corneli et al. |
| 2009/0249039 A1 | 10/2009 | Hook et al. |
| 2009/0276774 A1 | 11/2009 | Kinoshita |
| 2009/0276775 A1 | 11/2009 | Brown et al. |
| 2009/0328035 A1 | 12/2009 | Ganguly |
| 2010/0005234 A1 | 1/2010 | Ganga et al. |
| 2010/0082855 A1 | 4/2010 | Accapadi et al. |
| 2010/0169528 A1 | 7/2010 | Kumar et al. |
| 2011/0153893 A1 | 6/2011 | Foong et al. |
| 2011/0321061 A1 | 12/2011 | Craddock et al. |
| 2013/0067194 A1 | 3/2013 | Craddock et al. |

FOREIGN PATENT DOCUMENTS

| | | | |
|---|---|---|---|
| EP | 0902355 | A2 | 3/1999 |
| EP | 0955585 | A2 | 11/1999 |
| EP | 1096376 | A2 | 2/2001 |
| EP | 1489491 | A1 | 12/2004 |
| JP | 57191826 | A | 11/1982 |
| JP | 359081724 | A | 5/1984 |
| JP | 362079557 | A | 4/1987 |
| JP | 405053973 | A | 3/1993 |
| WO | WO9600940 | A1 | 6/1995 |
| WO | WO9938074 | A1 | 7/1999 |
| WO | WO 02/41157 | A2 | 5/2002 |

OTHER PUBLICATIONS

Device Identification Strings from OSR online; [online], internet archive date Mar. 13, 2005; retreived May 26, 2012, <URL: http://www.osronline.com/ddkx/install/idstrings_8tt3.htm>.*

Atari PCI BIOS and device driver specification 1.13, Chapters 2, 3, 4, and 6; [online], internet archive dates Dec. 12, 2007 and Feb. 8, 2007; retreived on May 24, 2012, <URL:http://kunden.wvnet.at/fichti/docs/pcibios-2.htm; pcibios-3.htm; pcibios-4.htm, pcibios-6.htm>.*

U.S. Appl. No. 12/708,284, "Load Pair Disjoint Facility and Instruction Therefore," filed Jun. 24, 2010.

U.S. Appl. No. 12/820,735, "High-Word Facility for Extending the Number of General Purpose Registers Available to Instructions," filed Jun. 22, 2010.

U.S. Appl. No. 12/820,768, "Instructions for Performing an Operation on Two Operands and Subsequently Storing an Original Value of Operand," filed Jun. 22, 2010.

U.S. Appl. No. 12/821,224, "Associating Input/Output Device Requests With Memory Associated With a Logical Partition," filed Jun. 21, 2010.

U.S. Appl. No. 12/821,239, "Input/Output (I/O) Expansion Response Processing in a Peripheral Component Interconnect Express (PCIE) Environment," filed Jun. 23, 2010.

U.S. Appl. No. 12/821,242, "A System and Method for Downbound I/O Expansion Request and Response Processing in a PCIe Architecture," filed Jun. 23, 2010.

U.S. Appl. No. 12/821,243, "Upbound Input/Output Expansion Request and Response Processing in a PCIE Architecture," filed Jun. 23, 2010.

U.S. Appl. No. 12/821,245, "A System and Method for Routing I/O Expansion Requests and Responses in a PCIE Architecture," filed Jun. 23, 2010.

U.S. Appl. No. 12/821,247, "Scalable I/O Adapter Function Level Error Detection, Isolation, and Reporting," filed Jun. 23, 2010.

U.S. Appl. No. 12/821,248, "Connected Input/Output HUB Management," filed Jun. 23, 2010.

U.S. Appl. No. 12/821,256, "Switch Failover Control in a Multiprocessor Computer System," filed Jun. 23, 2010.

U.S. Appl. No. 12/821,271, "Memory Error Isolation and Recovery in a Multiprocessor Computer System," filed Jun. 23, 2010.

U.S. Appl. No. 12/822,358, "Function Virtualization Facility for Function Query of a Processor," filed Jun. 24, 2010.

U.S. Appl. No. 12/822,368, "Function Virtualization Facility for Blocking Instruction Function of a Multi-Function Instruction of a Virtual Processor," filed Jun. 24, 2010.

Craddock et al., U.S. Appl. No. 12/821,170, "Translation of Input/Output Address to Memory Addresses" filed Jun. 23, 2010.

Craddock et al., U.S. Appl. No. 12/821,171, "Runtime Determination of Translation Formats for Adapter Functions," filed Jun. 23, 2010.

Craddock et al., U.S. Appl. No. 12/821,172, "Resizing Address Spaces Concurrent to Accessing the Address Spaces," filed Jun. 23, 2010.

Craddock et al., U.S. Appl. No. 12/821,174, "Multiple Address Spaces Per Adapter," filed Jun. 23, 2010.

Craddock et al., U.S. Appl. No. 12/821,175, "Converting a Message Signaled Interruption Into an I/O Adapter Event Notification," filed Jun. 23, 2010.

Brice et al., U.S. Appl. No. 12/821,177, "Converting a Message Signaled Interruption Into an I/O Adapter Event Notification to a Guest Operating System," filed Jun. 23, 2010.

Craddock et al., U.S. Appl. No. 12/821,178, "Identification of Types of Sources of Adapter Interruptions," filed Jun. 23, 2010.

Belmar et al., U.S. Appl. No. 12/821,179, "Controlling a Rate At Which Adapter Interruption Requests Are Processed," filed Jun. 23, 2010.

Craddock et al., U.S. Appl. No. 12/821,181, "Controlling the Selectively Setting of Operational Parameters for an Adapter," filed Jun. 23, 2010.

Craddock et al., U.S. Appl. No. 12/821,182, "Load Instruction for Communicating With Adapters," filed Jun. 23, 2010.

Craddock et al., U.S. Appl. No. 12/821,184, "Controlling Access by a Configuration to an Adapter Function," filed Jun. 23, 2010.

Coneski et al., U.S. Appl. No. 12/821,187, "Enable/Disable Adapters of a Computing Environment," filed Jun. 23, 2010.

Craddock et al., U.S. Appl. No. 12/821,190, "Guest Access to Address Spaces of Adapter," filed Jun. 23, 2010.

Coneski et al., U.S. Appl. No. 12/821,191, "Managing Processing Associated With Hardware Events," filed Jun. 23, 2010.

Craddock et al., U.S. Appl. No. 12/821,192, "Operating System Notification of Actions to Be Taken Responsive to Adapter Events," filed Jun. 23, 2010.

Brice et al., U.S. Appl. No. 12/821,193, "Measurement Facility for Adapter Functions," filed Jun. 23, 2010.

Craddock et al., U.S. Appl. No. 12/821,194, "Store/Store Block Instructions for Communicating With Adapters," filed Jun. 23, 2010.

Paulsen, Eric; "Local Memory Coaxes Top Speed from SCSI Masters," Electronic Design, v. 41, Apr. 15, 1993, pp. 76-6+.

Ganapathy, Narayanan; "General Purpose Operating System Support for Multiple Page Sizes," USENIX Annual Technical Conference (No. 98), 1998, pp. 91-104.

Talluri et al., "A New Page Table for 64-bit Address Spaces," Acm SIGOPS Operating Systems Review, vol. 29, Issue 5 (Dec. 1995), pp. 194-200.

(56) References Cited

OTHER PUBLICATIONS

"Large Page Support in the Linux Kernel," http://lwn.net/Articles/6969/ <retrieved on Jan. 26, 2010>.

Crawford, Catherine H. et al., "Accelerating Computing with the Cell Broadband Engine Processor," May 2008, CF '08, May 5-7, 2008, Ischia, Italy, pp. 3-11.

Baumann, Andrew, et al., "The Multikernel: A New OS Architecture for Scalable Multicore Systems," Oct. 2009, SOSP '09, Oct. 11-14, 2009, Big Sky, Montana, USA, pp. 29-43.

Swift, Michael M. et al., "Improving the Reliability of Commodity Operating Systems," ACM Transactions on Computer Systems, vol. 23, No. 1, Feb. 2005, pp. 77-110.

Xu, Min et al., "Towards a VMM-based Usage Control Framework for OS Kernel Integrity Protection," SACMAT '07, Jun. 20-22, 2007, Sophia Antipolis, France, pp. 71-80.

Huang, Wei et al., "A Case for High Performance Computing with Virtual Machines," ISC '06, Jun. 3, 28 30, Carins, Queensland, Australia, pp. 125-134, Jun. 3, 2006.

Mysore, Shashidhar et al., "Understanding and Visualizing Full Systems with Data Flow Tomography," SPOLOS '08, Mar. 1-5, 2008, Seattle, Washington, USA, pp. 211-221.

"DMA Engines Bring Multicast to Pci Express Systems," http://electronicdesign.com, Aug. 13, 2009, 3 pages.

"Xen Wiki," http://wiki.xensource.com/xenwik/VTdHowTo, 5 pages, Apr. 16, 2010.

Vaidyanathan, K., et al., "Exploiting RDMA Operations for Providing Efficient Fine-Grained Resource Monitoring in Cluster-based Servers," 1-4244-0328—Jun. 2006, 10 pages.

"IBM Enhances the IBM eServer zSeries 990 Family of Servers," Hardware Announcement, Oct. 7, 2003, pp. 1-11.

"Intel® Virtualization Technology for Directed I/O," Intel® Technology Journal, vol. 10, Issue 3, Aug. 10, 2006.

"I/O Virtualization and AMD's IOMMU," AMD Developer Central, http://developer.amd.com/documentation/articles/pages/892006101.aspx, Aug. 9, 2006.

"z/Architecture Principles of Operation," IBM Publication No. SA22-7832-07, Feb. 2009.

"z/VM: Running Guest Operating Systems," IBM Publication No. SC24-5997-02, Oct. 2001.

"z/VM: General Information Manual," IBM Publication No. GC24-5991-05, May 2003.

Winwood, Simon, et al., "Multiple Page Size Support in the Linux Kernel", Proceedings of Ottawa Linux Symposium, 2002.

"z/Architecture Principles of Operation," Chapter 17, pp. 17-1-17-30, IBM Publication No. SA22-7832-07, Feb. 2009.

"Intel® Itanium® Architecture Software Developer's Manual," vol. 2, Rev. 2.2, Jan. 2006.

Kamil et al., "Discussion #8 Topics: Paging, Multilevel Paging," Mar. 2004, pp. 1-3.

Office Action for U.S. Appl. No. 12/821,172 dated Dec. 12, 2011.

Final Office Action for U.S. Appl. No. 12,821,184 dated Jan. 24, 2012.

Office Action for U.S. Appl. No. 12/821,174 dated Jan. 19, 2012.

Office Action for U.S. Appl. No. 12/821,193 dated Feb. 25, 2012.

"PCI Local Bus Specification Revision 3.0," Aug. 2002, pp. 39, 44, 49-49, 58.

Office Action for U.S. Appl. No. 12/821,187 dated Feb. 28, 2012.

International Search Report and Written Opinion for PCT/EP2010/067039 dated Feb. 25, 2011.

International Search Report and Written Opinion for PCT/EP2010/067036 dated Feb. 14, 2011.

International Search Report and Written Opinion for PCT/EP2010/067030 dated Feb. 7, 2011.

International Search Report and Written Opinion for PCT/EP2010/067020 dated Apr. 5, 2011.

International Search Report and Written Opinion for PCT/EP2010/067025 dated Apr. 13, 2011.

International Search Report and Written Opinion for PCT/EP2010/067024 dated Apr. 27, 2011.

International Search Report and Written Opinion for PCT/EP2010/067019 dated Apr. 26, 2011.

International Search Report and Written Opinion for PCT/EP2010/067021 dated Apr. 28, 2011.

International Search Report and Written Opinion for PCT/EP2010/067043 dated Apr. 21, 2011.

International Search Report and Written Opinion for PCT/EP2010/067041 dated Apr. 26, 2011.

International Search Report and Written Opinion for PCT/EP2010/067031 dated Apr. 26, 2011.

International Search Report and Written Opinion for PCT/EP2010/067034 dated May 18, 2011.

International Search Report and Written Opinion for PCT/EP2010/067023 dated Jun. 15, 2011.

International Search Report and Written Opinion for PCT/EP2010/067032 dated May 27, 2011.

International Search Report and Written Opinion for PCT/EP2010/067038 dated Jun. 15, 2011.

"Chapter 6: Configuration Space" in PCI-SIG: "PCI Local Bus Specification Revision 3.0", Feb. 2004, pp. 213-254.

Hennet, P. et al., "Programmable Interrupt Vectors in Processors," IBM Technical Disclosure Bulletin, vol. 25, No. 5, Oct. 1, 1982, pp. 2641-2642.

Plambeck et al., "Development and Attributes of z/Architecture," IBM Journal of Research and Development, IBM Corporation, vol. 46, No. 4/05, Jul. 1, 2002, pp. 367-379.

"z/Architecture Principles of Operation, Chapter 3", Feb. 2008, pp. 1-71.

Gebringer, E. F., et al., "Virtual Memory Systems," CSC-506—Architecture of Parallel Computers Computer Science Department, College of Engineering, North Carolina, Dec. 31, 1999, XP002631523.

"z/Architecture—Principles of Operation," IBM Publication No. SA22-7832-05, Sixth Edition, Apr. 2007, Chapter 10, 10-1-10-138.

"PCI Local Bus Specification," Mar. 29, 2002, pp. 1-328.

McGee, H.T., "Technique for Resetting a Single Channel Path Under Operator Control in IBM System/370XA," IBM Technical Disclosure Bulletin, vol. 26, No. 10B, Mar. 1984.

"Decreased Latency Across PCI Express With I/O Virtualization Via a Hint Interface," IPCOM000185226D, Jul. 16, 2009, pp. 1-2.

Office Action for U.S. Appl. No. 12/821,171 dated Oct. 7, 2011.

Office Action for U.S. Appl. No. 12/821,182 dated Oct. 13, 2011.

Office Action for U.S. Appl. No. 12/821,184 dated Oct. 18, 2011.

Final Office Action for U.S. Appl. No. 12/821,171 dated Mar. 29, 2012.

Office Action for U.S. Appl. No. 12/821,179 dated Apr. 24, 2012.

Office Action for U.S. Appl. No. 12/821,177 dated May 2, 2012.

Final Office Action for U.S. Appl. No. 12/821,185 dated Jun. 6, 2012.

"Atari PCI BIOS and Device Drive Specification 1.13," Chapters 2, 3, 4 and 6; [online], internet archive dates Dec. 12, 2007 and Feb. 8, 2007; retrieved on May 24, 2012, 13 pages <URL:http://kunden.wvnet.at/fichti/docs/pcibios-2.htm; pcibios-3.htm; pcibios-4.htm, pcibios-6.htm>.

"PCI Device Access Under 32-bit PM DOS from Open Watcom," [online], internet archive date Jul. 19, 2006; retrieved May 26, 2012, 14 pages <URL:http://www.openwatcom.org/index.php/PCI_Device_access_under_32-BitPM_DOS>.

Device Identification Strings from OSR online; [online], internet archive date Mar. 13, 2005; retrieved May 26, 2012, 3 pages <URL:http//www.osronline.com/ddkx/install/idstrings_8tt3.htm>.

Office Action for U.S. Appl. No. 12/821,190 dated Jun. 12, 2012.

Office Action for U.S. Appl. No. 12/821,174 dated Jun. 15, 2012.

International Search Report and Written Opinion for PCT/EP2010/067035 dated Mar. 8, 2011.

Final Office Action for U.S. Appl. No. 12/821,187 dated Jul. 16, 2012.

Office Action for U.S. Appl. No. 12/821,178 dated Jul. 16, 2012.

Office Action for U.S. Appl. No. 12/821,171 dated Jul. 19, 2012.

Office Action for U.S. Appl. No. 13/462,152 dated Aug. 28, 2012.

Office Action for U.S. Appl. No. 12/821,175 dated Sep. 17, 2012.

International Search Report and Written Opinion for PCT/EP2010/067029 dated Mar. 2, 2011.

(56) References Cited

OTHER PUBLICATIONS

"IBM System/390 I/O Call Reporting Process," IBM Technical Disclosure Bulletin, vol. 36, No. 1, Jan. 1993, pp. 164-169, XP000222812.

"Means for Channel Subsystem-Initiated Communication," IBM Technical Disclosure Bulletin, vol. 33, No. 12, May 1991, p. 169, XP000121623.

International Search Report and Written Opinion for PCT/EP2010/067028 dated Mar. 8, 2011.

International Search Report and Written Opinion for PCT/EP2010/067042 dated Apr. 28, 2011.

Communication Pursuant to Article 94(3) EPC for Application No. 10 776 350.0-2212 dated Oct. 31, 2012, pp. 1-6.

Final Office Action for U.S. Appl. No. 12/821,174 dated Nov. 13, 2012, pp. 1-29.

Office Action for U.S. Appl. No. 12/821,170 dated Feb. 1, 2013, pp. 1-28.

Office Action for U.S. Appl. No. 13/672,028 dated Feb. 1, 2013, pp. 1-20.

Communication Pursuant to Article 94(3) EPC for Application No. 10 784 272.6-1243 dated Feb. 6, 2013, pp. 1-7.

Final Office Action for U.S. Appl. No. 12/821,171 dated Mar. 18, 2013, pp. 1-11.

Office Action for U.S. Appl. No. 12/821,181 dated Mar. 26, 2013, pp. 1-37.

Notice of Allowance for U.S. Appl. No. 12/821,172 dated Apr. 30, 2013, pp. 1-30.

Communication Pursuant to Article 94(3) EPC for Application No. 10 776 345.0-1957, dated May 31, 2013, pp. 1-6.

Notice of Allowance for U.S. Appl. No. 13/462,152 dated Jun. 7, 2013, pp. 1-13.

Notice of Allowance for U.S. Appl. No. 12/821,175 dated Jun. 20, 2013, pp. 1-14.

Office Action for U.S. Appl. No. 12/821,190 dated Sep. 4, 2013, pp. 1-6.

Office Action for U.S. Appl. No. 12/821,174 dated Nov. 19, 2013, pp. 1-35.

Communication Pursuant to Article 94(3) EPC for Application No. 10 778 994.3-1960, dated Jul. 3, 2013, pp. 1-7.

\* cited by examiner

FIG. 5A
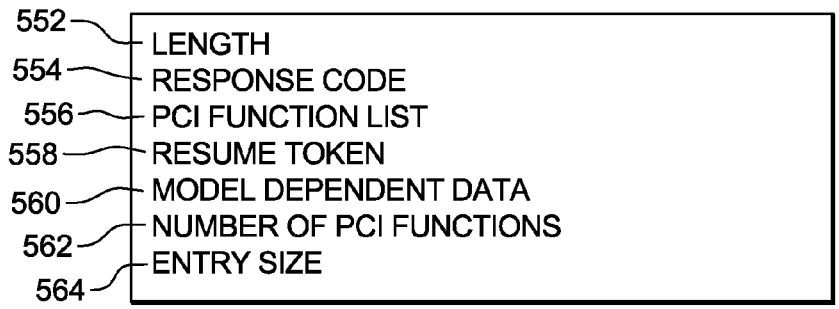
FIG. 5B
FIG. 5C
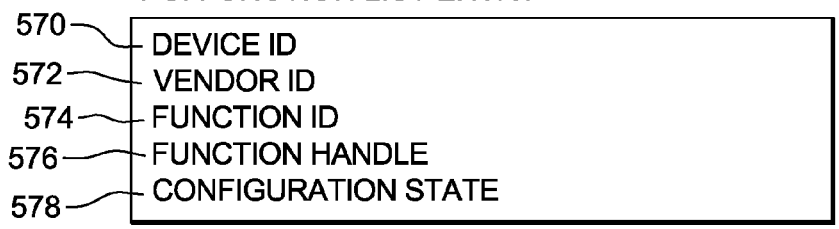
FIG. 5D

DISCOVERY BY OPERATING SYSTEM OF INFORMATION RELATING TO ADAPTER FUNCTIONS ACCESSIBLE TO THE OPERATING SYSTEM

BACKGROUND

This invention relates, in general, to input/output (I/O) processing in a computing environment, and in particular, to obtaining information regarding the I/O configuration of the computing environment.

Different computing architectures have different I/O configurations. For instance, System z® machines based on the z/Architecture® offered by International Business Machines Corporation have an I/O configuration that includes a channel subsystem having channels and subchannels. Associated with this channel subsystem is an interface, referred to as a Channel Subsystem Call instruction, by which operating systems can manipulate the various I/O resources of the configuration.

Other types of I/O configurations, however, may be used that do not include traditional I/O devices, such as channels and subchannels. For instance, some configurations use Peripheral Component Interconnect (PCI) adapters, which have attachment and communication paradigms that are different than that of traditional I/O devices.

BRIEF SUMMARY

In accordance with an aspect of the present invention, a capability is provided for obtaining information regarding an I/O configuration that includes adapters, such as PCI adapters.

The shortcomings of the prior art are overcome and advantages are provided through the provision of a computer program product for obtaining I/O hardware information. The computer program product includes a computer readable storage medium readable by a processing circuit and storing instructions for execution by the processing circuit for performing a method. The method includes, for instance, responsive to execution of an instruction issued by an operating system obtaining, by a processor of a computing environment, a list of one or more adapter functions of an I/O configuration accessible by the processor, the operating system absent knowledge of an adapter configuration topology of adapter functions of the computing environment, and the list including one or more function handles corresponding to the one or more adapter functions; and responsive to execution of an instruction issued by the operating system, using a function handle of the one or more function handles to obtain one or more attributes regarding the adapter function identified by the function handle, the function handle usable by one or more instructions to access the adapter function corresponding to the function handle.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5A depicts one embodiment of a Call Logical Processor instruction used in accordance with an aspect of the present invention;

FIG. 5B depicts one embodiment of a request block used by the Call Logical Processor instruction of FIG. 5A for a list operation, in accordance with an aspect of the present invention;

FIG. 5C depicts one embodiment of a response block for the list operation of FIG. 5B, in accordance with an aspect of the present invention;

FIG. 5D depicts one embodiment of a function list entry used in accordance with an aspect of the present invention;

DETAILED DESCRIPTION

In accordance with an aspect of the present invention, a capability is provided for obtaining by an operating system (or other software, such as other programs, etc.) input/output (I/O) hardware information relating to adapters of an I/O configuration. (As used herein, the term operating system includes operating system device drivers). This information may be obtained absent knowledge of a definition of the I/O configuration. That is, no knowledge of the types of adapters in the configuration nor any knowledge of the configuration topology is needed by the operating system. The operating system does not need to perform a bus walk to obtain the adapter information; indeed, in a partitioned or otherwise virtualized computing environment, for example, the operating system is not permitted to perform the bus walk. Instead, the firmware performs the bus walk, and the operating system is able to obtain the information without a bus walk.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Further, the term adapter includes any type of adapter (e.g., storage adapter, processing adapter, network adapter, crypto adapter, PCI adapter, other type of input/output adapters, etc.). Moreover, in the examples presented herein, adapter is used interchangeably with adapter function (e.g., PCI function), unless otherwise noted. In one embodiment, an adapter includes one adapter function. However, in other embodiments, an adapter may include a plurality of adapter functions. One or more aspects of the present invention are applicable whether an adapter includes one adapter function or a plurality of adapter functions. In one embodiment, if an adapter includes a plurality of adapter functions, then each adapter function may be discovered in accordance with an aspect of the present invention.

Figure 1A:
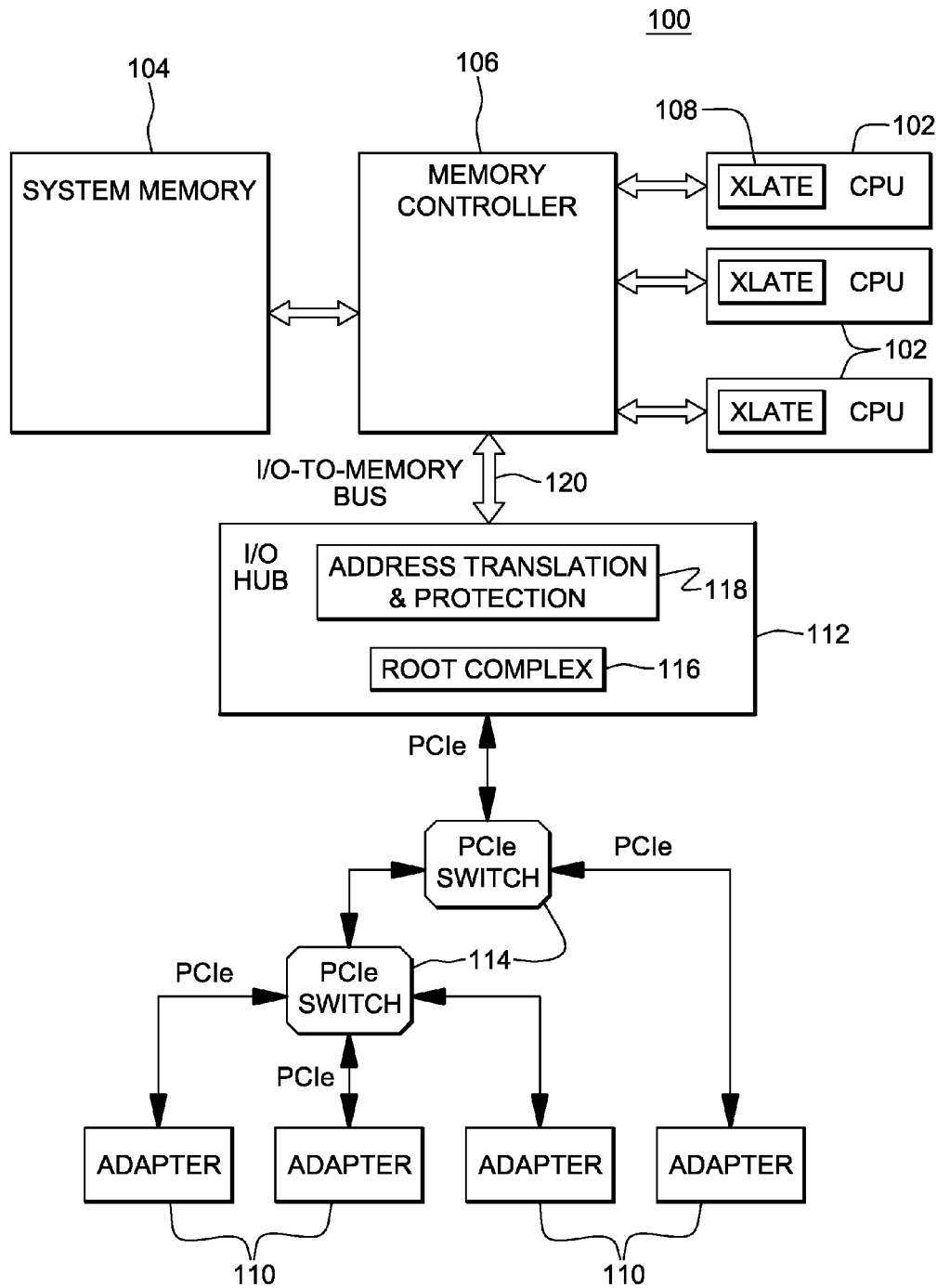
FIG. 1A depicts one embodiment of a computing environment to incorporate and use one or more aspects of the present invention.

One embodiment of a computing environment to incorporate and use one or more aspects of the present invention is described with reference to FIG. 1A. In one example, a computing environment 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety. IBM®, System z® and z/Architecture® are registered trademarks of International Business Machines Corporation, Armonk, N.Y. Other names used herein may be registered trademarks, trademarks or product names of International Business Machines Corporation or other companies.

In one example, computing environment 100 includes one or more central processing units (CPUs) 102 coupled to a system memory 104 (a.k.a., main memory) via a memory controller 106. To access system memory 104, a central processing unit 102 issues a read or write request that includes an address used to access system memory. The address included in the request is typically not directly usable to access system memory, and therefore, it is translated to an address that is directly usable in accessing system memory. The address is translated via a translation mechanism (XLATE) 108. For example, the address is translated from a virtual address to a real or absolute address using, for instance, dynamic address translation (DAT).

The request, including the address (translated, if necessary), is received by memory controller 106. In one example, memory controller 106 is comprised of hardware and is used to arbitrate for access to the system memory and to maintain the memory's consistency. This arbitration is performed for requests received from CPUs 102, as well as for requests received from one or more adapters 110. Like the central processing units, the adapters issue requests to system memory 104 to gain access to the system memory.

In one example, adapter 110 is a Peripheral Component Interconnect (PCI) or PCI Express (PCIe) adapter that includes one or more PCI functions. A PCI function issues a request that is routed to an input/output hub 112 (e.g., a PCI hub) via one or more switches (e.g., PCIe switches) 114. In one example, the input/output hub is comprised of hardware, including one or more state machines.

The input/output hub includes, for instance, a root complex 116 that receives the request from a switch. The request includes an input/output address that is used to perform a direct memory access (DMA) operation or to request a message signaled interruption (MSI), as examples. This address is provided to an address translation and protection unit 118 which accesses information used for either the DMA or the MSI request.

Figure 1B:
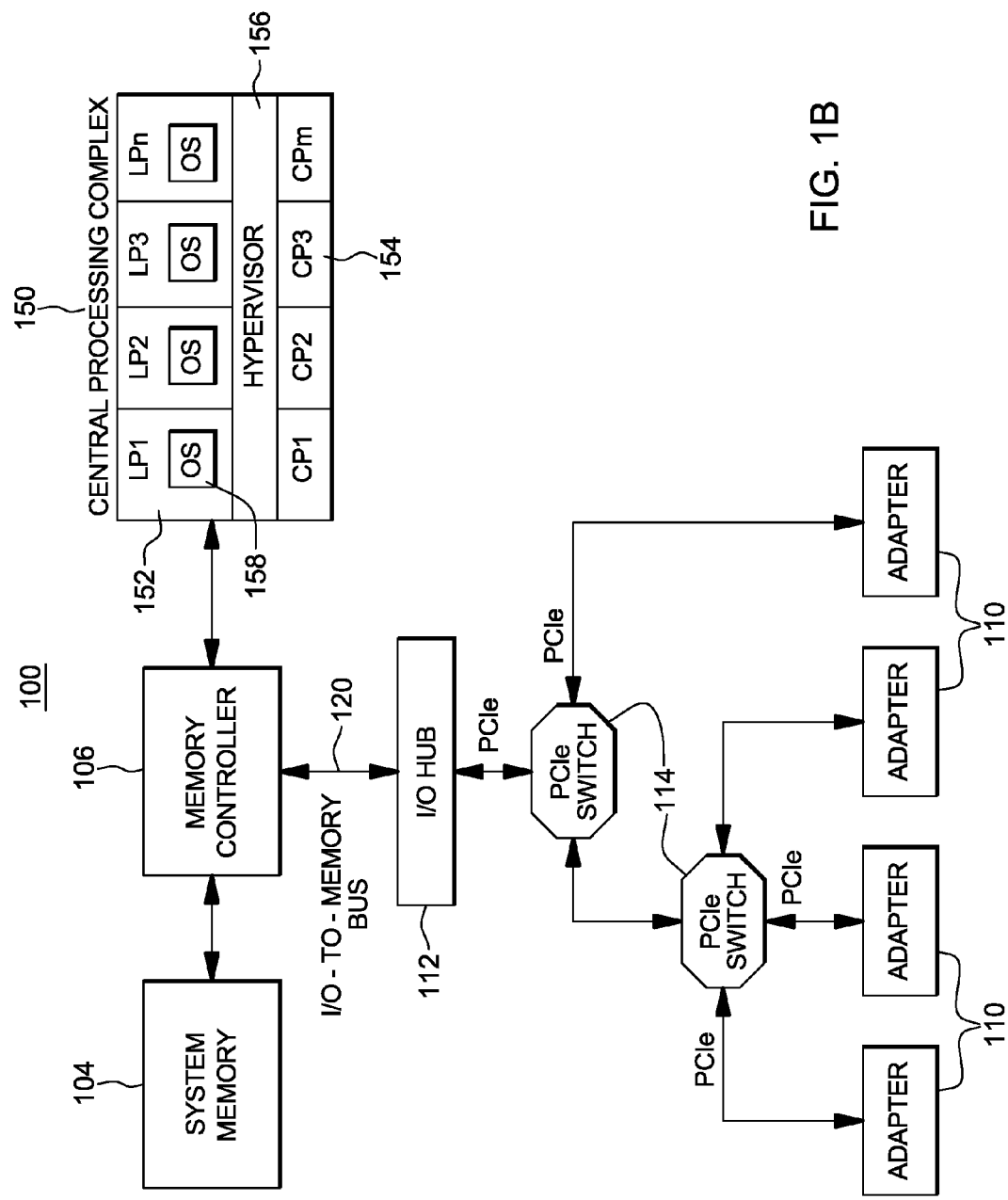
FIG. 1B depicts another embodiment of a computing environment to incorporate and use one or more aspects of the present invention.

In a further embodiment of a computing environment, in addition to or instead of one or more CPUs 102, a central processing complex is coupled to memory controller 106 as shown in FIG. 1B. In this example, a central processing complex 150 includes, for instance, one or more partitions or zones 152 (e.g., logical partitions LP1-LPn), one or more central processors (e.g., CP1-CPm) 154, and a hypervisor 156 (e.g., a logical partition manager), each of which is described below.

Each logical partition 152 is capable of functioning as a separate system. That is, each logical partition can be independently reset, initially loaded with an operating system or a hypervisor (such as z/VM® offered by International Business Machines Corporation, Armonk, N.Y.), if desired, and operate with different programs. An operating system, a hypervisor, or an application program running in a logical partition appears to have access to a full and complete system, but only a portion of it is available. A combination of hardware and Licensed Internal Code (also referred to as microcode or millicode) keeps a program in a logical partition from interfering with the program in a different logical partition. This allows several different logical partitions to operate on a single or multiple physical processors in a time slice manner. In this particular example, each logical partition has a resident operating system 158, which may differ for one or more logical partitions. In one embodiment, operating system 158 is a z/OS® or zLinux operating system, offered by International Business Machines Corporation, Armonk, N.Y. z/OS® and z/VM® are registered trademarks of International Business Machines Corporation, Armonk, N.Y.

Central processors 154 are physical processor resources that are allocated to the logical partitions. For instance, a logical partition 152 includes one or more logical processors, each of which represents all or a share of the physical processor resource 154 allocated to the partition. The underlying processor resource may either be dedicated to that partition or shared with another partition.

Logical partitions 152 are managed by hypervisor 156 implemented by firmware running on processors 154. Logical partitions 152 and hypervisor 156 each comprise one or more programs residing in respective portions of central storage associated with the central processors. One example of hypervisor 156 is the processor Resource/Systems Manager (PR/SM), offered by International Business Machines Corporation, Armonk, N.Y.

Although, in this example, a central processing complex having logical partitions is described, one or more aspects of the present invention may be incorporated in and used by other processing units, including single or multi-processor processing units that are not partitioned, among others. The central processing complex described herein is only one example.

Further details regarding system memory and the input/output hub are described with reference to FIG. 2. In this example, the memory controller is not shown, but may be used. The I/O hub may be coupled to system memory 104 and/or processor 204 directly or via a memory controller.

Figure 2:
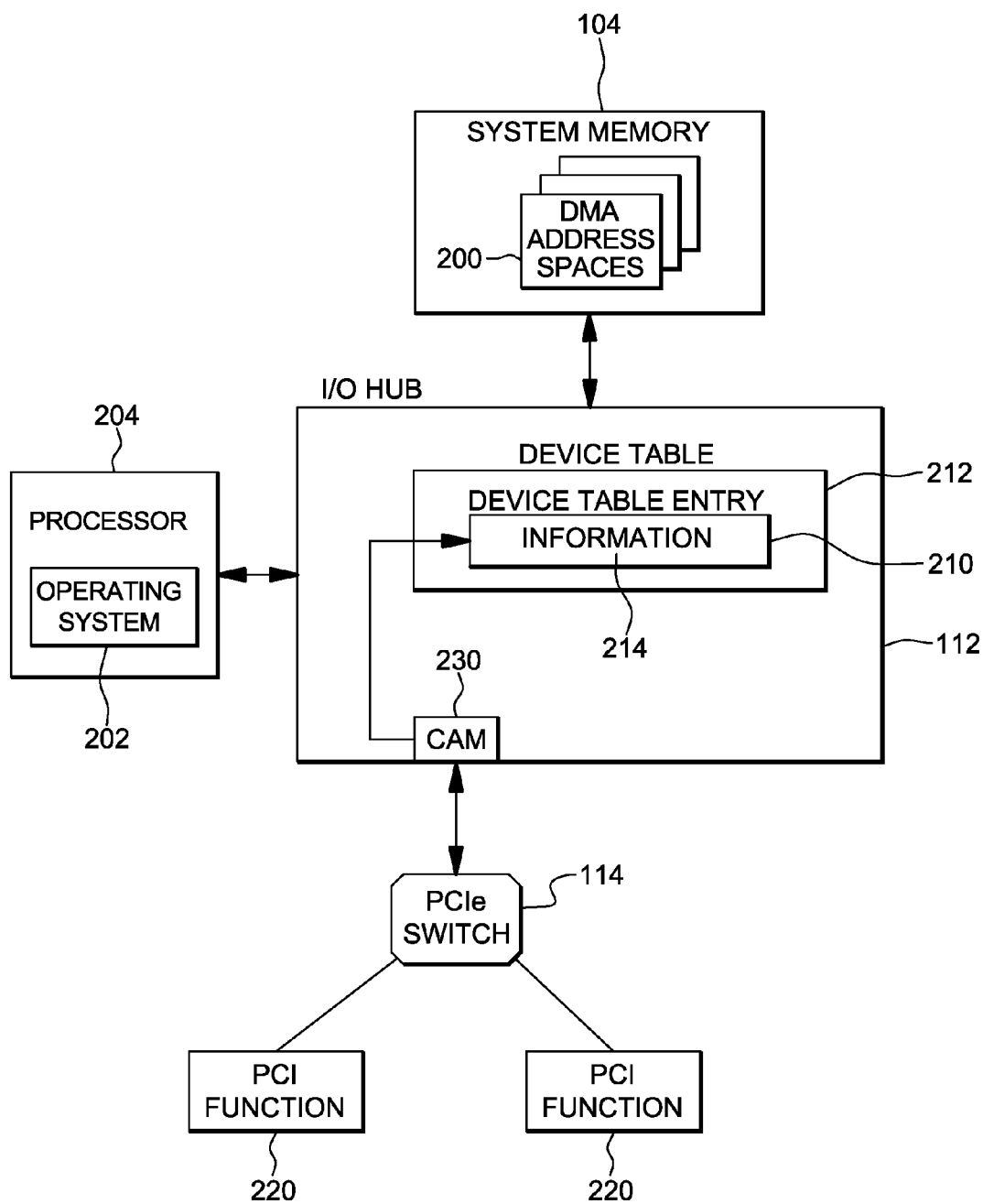
FIG. 2 depicts one embodiment of further details of system memory and the I/O hub of FIGS. 1A and 1B, in accordance with an aspect of the present invention.

Referring to FIG. 2, in one example, system memory 104 includes one or more address spaces 200. An address space is a particular portion of system memory that has been assigned to a particular component of the computing environment, such as a particular adapter. In one example, the address space is accessible by direct memory access (DMA) initiated by the adapter, and therefore, an address space is referred to in the examples herein as a DMA address space. However, in other examples, direct memory access is not used to access the address space.

A DMA address space is assigned to a particular adapter by, for instance, an operating system (e.g., operating system 202) executing within a processor 204 (e.g., CPU 102 or a CP 154 assigned to an LP 152). This assignment is performed via a registration process, which causes an initialization (via, e.g., trusted software) of a device table entry 210 for that adapter. There is one device table entry per assigned address space. The device table entry is located in a device table 212 located in I/O hub 112. For example, device table 212 is located within the address translation and protection unit of the I/O hub.

In one example, device table entry 210 includes information 214 usable in providing various services for the adapter. For example, the device table entry may include an enable indicator that indicates whether the device table entry is enabled for a particular adapter; information to facilitate address translation and/or interrupt handling; and/or other information depending on the service to be performed.

In one embodiment, the device table entry to be used by a particular adapter issuing requests is located using a requestor identifier (RID) (and/or a portion of the address) located in a request issued by a PCI function 220 associated with an adapter. The requestor id (e.g., a 16-bit value specifying, for instance, a bus number, device number and function number) is included in the request as well as an I/O address to be used. The request, including the RID and the I/O address, are provided to, e.g., a contents addressable memory (CAM) 230 via, e.g., one or more switches 114, which is used to provide an index value. For instance, the CAM includes multiple entries, with each entry corresponding to an index into the device table. Each CAM entry includes the value of a RID. If, for instance, the received RID matches the value contained in an entry in the CAM, a corresponding device table index is used to locate the device table entry. That is, the output of the CAM is used to index into device table 212 to locate device table entry 210. If there is no match, the received packet is discarded. (In other embodiments, a CAM or other lookup is not needed and the RID is used as the index.)

In addition to a device table entry, another data structure is also associated with an adapter, which includes information regarding the adapter. In one or more particular examples described herein, the term adapter refers to an adapter function (e.g., a PCI function), and therefore, the data structure is referred to as a function table entry (FTE). Although the examples herein refer to PCI functions, in other embodiments, other adapter functions or adapters may be discovered, in accordance with an aspect of the present invention.

Figure 3A:
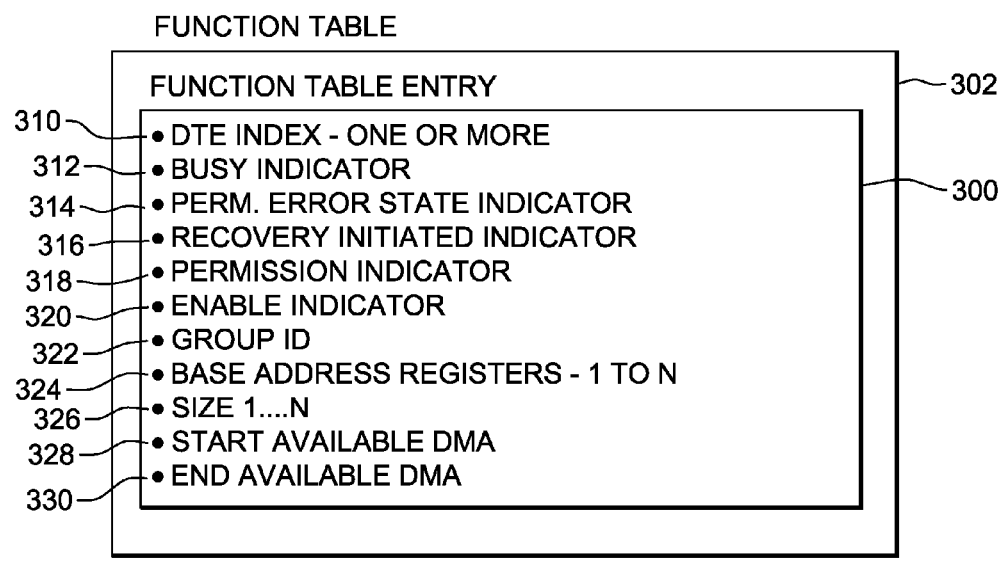
FIG. 3A depicts one example of a function table entry used in accordance with an aspect of the present invention.

As shown in FIG. 3A, in one example, a function table entry 300 is an entry in a function table 302 stored, for instance, in secure memory. Each function table entry 300 includes information to be used in processing associated with its adapter. In one example, function table entry 300 includes one or more device table entry indices 310, each of which is used as an index into the device table to locate its corresponding device table entry (a PCI function may have a plurality of address spaces assigned thereto, and therefore, a plurality of DTEs); a busy indicator 312 that indicates whether the PCI function is busy; a permanent error state indicator 314 that indicates whether the function is in a permanent error state; a recovery initiator indicator 316 that indicates whether recovery has been initiated for the function; a permission indicator 318 that indicates whether the operating system trying to enable the PCI function has authority to do so; an enable indicator 320 indicating whether the function is enabled (e.g., 1=enabled, 0=disabled); a group id 322 identifying a group to which the adapter belongs, if any; Base Address Registers (BARs) 1-N 324 used to indicate the base address of an I/O address space or memory space of the adapter (memory of an adapter may include one or more address spaces, including, for instance, a configuration space, an I/O space and/or one or more memory spaces); sizes 1 . . . N 326 used in defining the size of an adapter address space, as described below; start available DMA (SDMA) 328 which indicates the beginning of an address space available for DMA operations; and an end available DMA (EDMA) 330 which indicates the end of the address space.

In one example, the busy indicator, permanent error state indicator, and recovery initiated indicator are set based on monitoring performed by the firmware. Further, the permission indicator is set, for instance, based on policy. The BAR information and group id are based on configuration information discovered during the bus walk. The SDMA and EDMA are set by the firmware based on policy and details of the configuration. In other embodiments, the function table entry may include more, less or different information, and the fields may be set by other mechanisms than described herein.

To locate a function table entry in a function table that includes one or more entries, in one embodiment, a function handle is used. For instance, one or more bits of the function handle are used as an index into the function table to locate a particular function table entry.

Figure 3B:
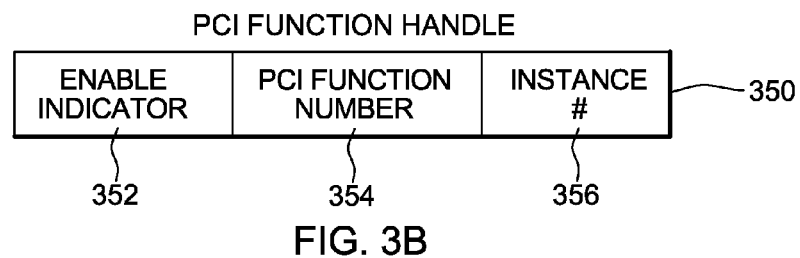
FIG. 3B depicts one embodiment of a function handle used in accordance with an aspect of the present invention.

Referring to FIG. 3B, additional details regarding a function handle are described. In one example, a function handle 350 includes an enable indicator 352 that indicates whether the PCI function handle is enabled; a PCI function number 354 that identifies the function (this is a static identifier and may be used as an index into the function table); and an instance number 356 which indicates the particular instance of this function handle. For instance, each time the function is enabled, the instance number is incremented to provide a new instance number.

In order for an operating system to use an adapter function, the operating system performs discovery to obtain an indication of the adapter functions accessible to the operating system and to obtain information regarding those adapter functions. This processing is described in further detail with reference to FIG. 4.

Figure 4:
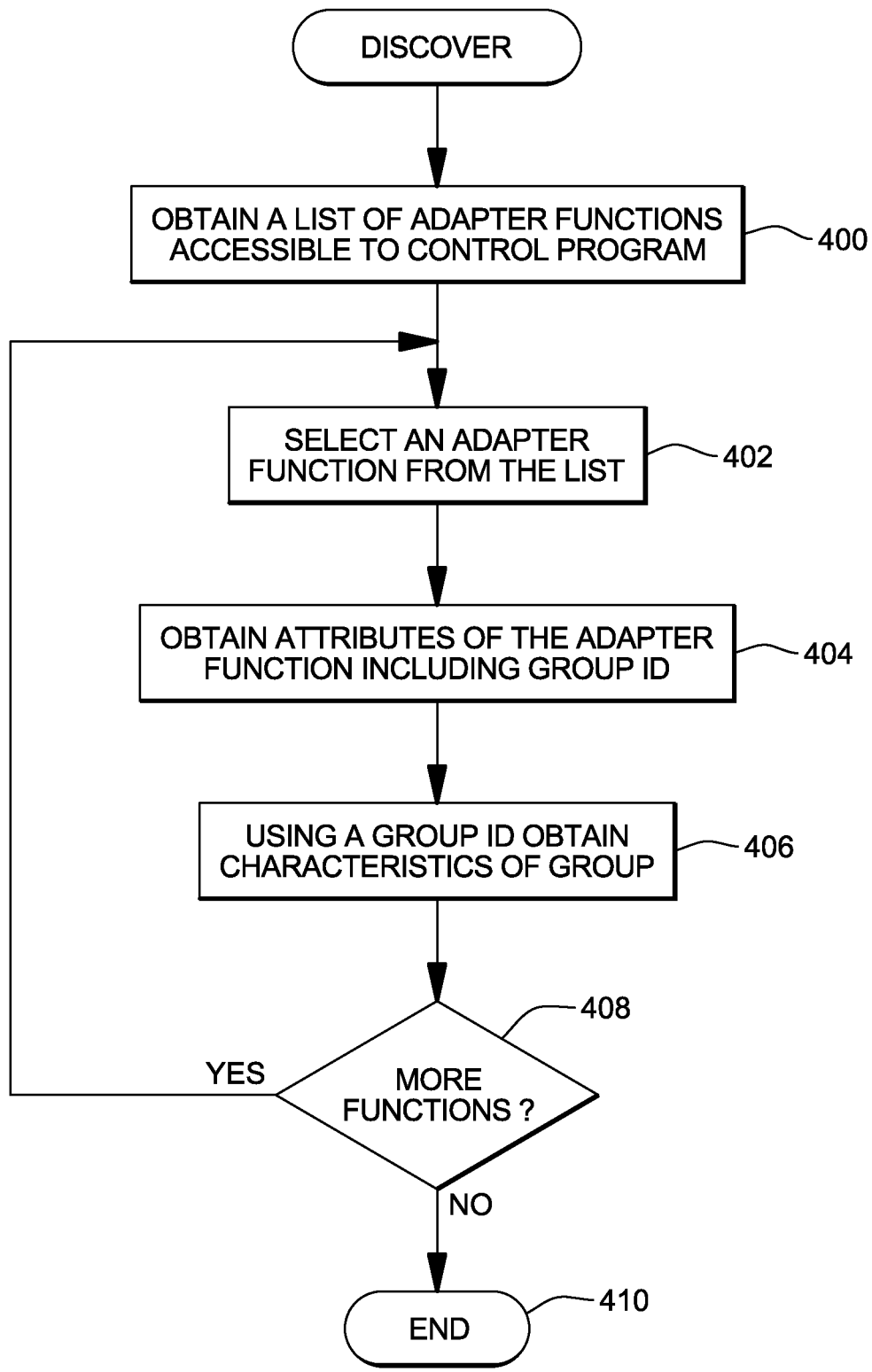
FIG. 4 depicts one embodiment of the logic to discover information relating to adapter functions, in accordance with an aspect of the present invention.

Referring to FIG. 4, one embodiment of a discover process is described. In one example, this logic is performed by a processor, responsive to a request of an operating system that wishes to access an adapter function. Initially, responsive to executing the instruction, the operating system obtains a list of adapter functions accessible to the operating system, STEP 400. In one example, this list is obtained by issuing a Call Logical Processor instruction and specifying a list operation, as described in further detail below. The list of adapter functions that are returned includes the function handles for those adapter functions.

Responsive to receiving the function handles, the operating system selects an adapter function from the list, STEP 402, and obtains attributes of that adapter function, STEP 404. In one example, this information is obtained by issuing a Call Logical Processor instruction with a query function operation, as described below. One of the attributes that may be returned is a group identifier. If a group identifier is returned, it identifies a group of one or more adapter functions for which this adapter function is included.

Assuming a group identifier is returned, the group identifier may be used to obtain common characteristics of the group, STEP 406. The group characteristics may describe capabilities of the I/O infrastructure including, but not limited to, the I/O hub and the controlling firmware. In one example, this information is obtained by issuing a Call Logical Processor instruction with a query group operation, as described below.

Thereafter, a determination is made as to whether there are more adapter functions in the obtained list and whether the operating system would like to find out additional information regarding another function, INQUIRY 408. If there is at least one additional adapter function for which the operating system would like to find out additional information, then processing returns to STEP 402. Otherwise, the discovery process is complete, STEP 410.

As described above, in one embodiment, to obtain the information regarding an adapter function, a Call Logical Processor instruction is used. One embodiment of this instruction is depicted in FIG. 5A. As shown, in one example, a Call Logical Processor (CLP) instruction 500 includes an operation code 502 indicating that it is the Call Logical Processor instruction; and an indication for a command 504. In one example, this indication is an address of a request block that describes the command to be performed, and the information in the request block is dependent on the command. Examples of requests blocks and corresponding response blocks for various commands are described with reference to FIGS. 5B-7B.

Referring initially to FIG. 5B, a request block for a list PCI functions command is provided. The list PCI functions command is used to obtain a list of PCI functions that are assigned to the requesting configuration (e.g., the requesting operating system). A request block 520 includes a number of parameters, such as, for instance:
- Length field 522: This field indicates the length of the request block;
- Command Code 524: This field indicates the list PCI functions command; and
- Resume Token 526: This field is an integer that is used to either start a new list PCI functions command or resume a previous list PCI functions command, as described in further detail below.
- When the resume token field in the command request block includes, for instance, a value of zero, a new list of PCI functions is requested. When the resume token field includes, for instance, a non-zero value, which was returned from a previous list PCI functions command, a continuation of a previous list of PCI functions is requested.

Responsive to issuing and processing the Call Logical Processor instruction for a list PCI functions command, a response block is returned. One embodiment of the response block is depicted in FIG. 5C. In one example, a response block 550 for a list PCI functions command includes:
- Length field 552: This field indicates the length of the response block;
- Response Code 554: This field indicates a status of the command;
- PCI Function List 556: This field indicates a list of one or more PCI functions available to the requesting operating system;
- Resume Token 558: This field indicates whether a continuation of a previous list of PCI functions is requested. In one example, when the resume token in the request block and the resume token in the response block are zero, all PCI functions assigned to the requesting configuration are represented in the PCI function list; if the resume token in the request block is zero and the resume token in the response block is not zero, additional PCI functions assigned to the request configuration may exist that have not been represented in the list; if the resume token in the request block is not zero and the resume token in the response block is zero, from the resume point, remaining PCI functions assigned to the requesting configuration are represented in the list; when both the resume tokens in the request and response block are not zero from the resume point, additional PCI functions assigned to the requesting configuration may exist that have not been represented in any associated PCI function list. The resume token remains valid for an indefinite period of time after being returned, but it may be invalid due to a variety of model dependent reasons, including system load elapse time;
- Model Dependent Data 560: This field includes data that depends on the system;
- Number of PCI Functions 562: This field indicates the maximum number of PCI functions supported by the facility; and
- Entry Size 564: This field indicates the size of each entry in the PCI function list.

Further details regarding the PCI function list are described with reference to FIG. 5D. In one example, the PCI function list includes a plurality of entries and each entry 556 includes the following information, as an example:
- Device ID 570: This field indicates the I/O adapter associated with the corresponding PCI function;
- Vendor ID 572: This field identifies the manufacturer of the I/O adapter associated with the corresponding PCI function;
- Function Identifier 574: This field includes a persistent identifier of the PCI function;
- Function Handle 576: This field identifies a PCI function. The PCI function handle stored is a general handle when a specified bit of the handle is zero, and it is an enabled handle when that bit is one. If the PCI function is disabled, a general PCI function handle is stored. If the PCI function is enabled, an enabled PCI function handle is stored. A PCI function handle is not, in one example, persistent beyond an IPL, which differs from the PCI function ID, which is persistent and is set for the life of the I/O configuration definition. Further details regarding one embodiment of a function handle are described above with reference to FIG. 3B; and Configuration State 578: This field indicates the state of the PCI function. When this indicator is, for instance, zero, the state is standby, and when, for instance, one, the state is configured. When in standby, the PCI function handle is the general PCI function handle, and when configured, it is either the general or enabled PCI function handle depending on whether the PCI function is enabled.

Subsequent to obtaining the list of adapter functions, information may be obtained regarding the attributes of a selected function as designated by a specified PCI function handle. This information may be obtained by issuing a CLP instruction with a query function command.

Figure 6A:
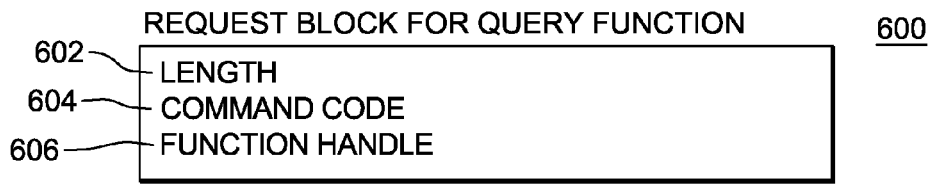
FIG. 6A depicts one embodiment of a request block used by the Call Logical Processor instruction of FIG. 5A for a query function operation, in accordance with an aspect of the present invention.

One embodiment of the request block for a query PCI function command is described with reference to FIG. 6A. In one example, request block 600 includes, for instance:

Length field 602: This field indicates the length of the request block;

Command Code 604: This field indicates the query PCI function command; and

Function Handle 606: This field includes the PCI function handle (e.g., general or enabled) that designates the PCI function to be queried.

Figure 6B:
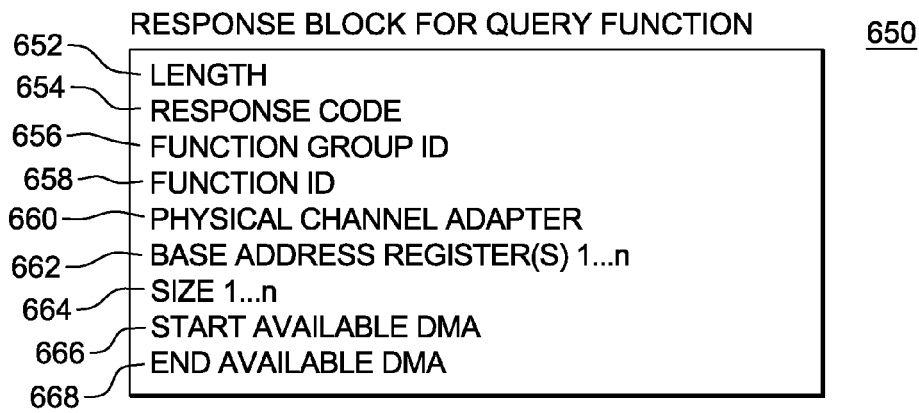
FIG. 6B depicts one embodiment of a response block for the query function operation of FIG. 6A, in accordance with an aspect of the present invention.

Responsive to issuing the Call Logical Processor instruction for the query PCI function command, a response block is returned. One embodiment of the response block is depicted in FIG. 6B. In one example, a response block 650 includes the following:

Length 652: This field indicates the length of the response block;

Response Code 654: This field indicates a status of the command;

Function Group ID 656: This field indicates the PCI function group identifier. A PCI function group identifier is used to associate a group of PCI functions with a set of attributes (also referred to herein as characteristics). Each PCI function with the same PCI function group identifier has the same set of attributes;

Function ID 658: The PCI function id is a persistent identifier of the PCI function originally specified by the PCI function handle and is set for the life of the I/O configuration definition;

Physical Channel Adapter 660: This value represents a model dependent identification of the location of the physical I/O adapter which corresponds to the PCI function;

Base Address Registers (BARs) 1 . . . n 662: This field includes a plurality of unsigned integers, designated as $BAR_o$-$BAR_n$, which are associated with the originally specified PCI function, and whose values are also stored in the base address registers associated with the PCI function. Each BAR specifies the starting address of a memory space or I/O space within the adapter, and also indicates the type of address space, that is whether it is a 64 or 32 bit memory space, or a 32 bit I/O space, as examples;

Size 1 . . . n 664: This field includes a plurality of unsigned integers, designated as $SIZE_0$-$SIZE_n$. The value of a Size field, when non-zero, represents the size of each address space with each entry corresponding to a previously described BAR.

Further details regarding BAR and Size are described below.

1. When a BAR is not implemented for a PCI function, the BAR field and its corresponding size field are both stored as zeros.
2. When a BAR field represents either an I/O address space or a 32-bit memory-address space, the corresponding size field is nonzero and represents the size of the address space.
3. When a BAR field represents a 64-bit memory address space,
   a. The $BAR_n$ field represents the least significant address bits.
   b. The next consecutive $BAR_{n+1}$ field represents the most significant address bits.
   c. The corresponding $SIZE_n$ field is nonzero and represents the size of the address space.
   d. The corresponding $SIZE_{n+1}$ field is not meaningful and is stored as zero.

Start Available DMA 666: This field includes an address which indicates the beginning of a range of PCI addresses that are available for DMA operations;

End Available DMA 668: This field includes a value which indicates the end of a range of PCI addresses that are available for DMA operations.

In addition to obtaining attributes regarding the specific adapter function, attributes may also be obtained regarding the group that includes this function. These common attributes may be obtained from issuing a CLP instruction with a query PCI function group command. This command is used to obtain a set of characteristics that are supported for a group of one or more PCI functions designated by the specified PCI function group identifier. A PCI function group identifier is used to associate a group of PCI functions with the same set of characteristics. One embodiment of request block for the query PCI function group command is described with reference to FIG. 7A. In one example, request block 700 includes the following:

Length field 702: This field indicates the length of the request block;

Command Code 704: This field indicates the query PCI function group command; and Function Group ID 706: This field specifies the PCI function group identifier for which attributes are to be obtained.

Figure 7A:
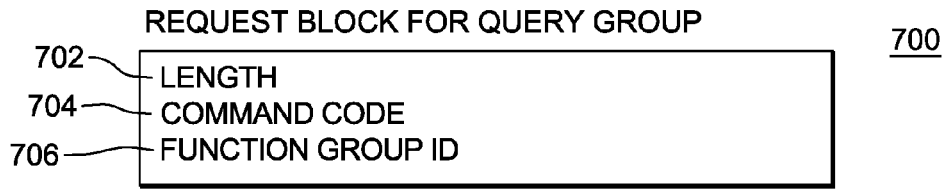
FIG. 7A depicts one embodiment of a request block used by the Call Logical Processor instruction of FIG. 5A for a query group operation, in accordance with an aspect of the present invention.
Figure 7B:
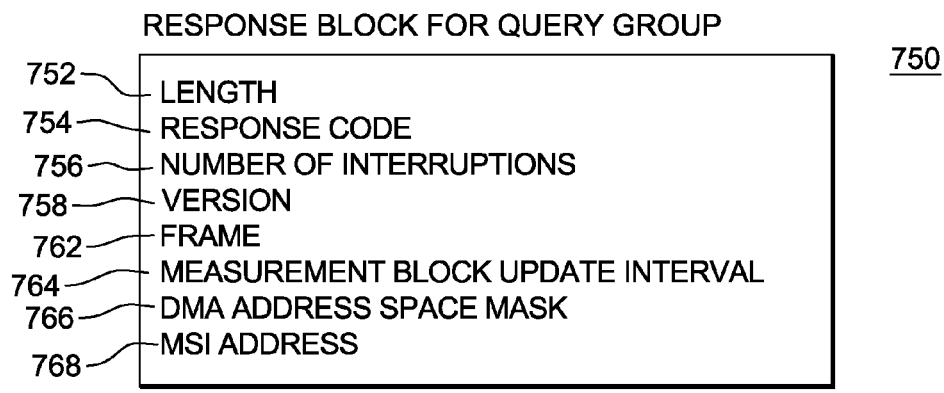
FIG. 7B depicts one embodiment of a response block for the query group operation of FIG. 7A, in accordance with an aspect of the present invention.

Responsive to issuing and processing the Call Logical Processor instruction with a query PCI function group command, a response block is returned. One embodiment of the response block is depicted in FIG. 7B. In one example, a response block 750 includes:

Length Field 752: This field indicates the length of the response block;

Response Code 754: This field indicates a status of the command;

Number of Interruptions 756: This field indicates the maximum number of consecutive MSI vector numbers (i.e., interruption event indicators) that are supported by the PCI facility for each PCI function in the specified PCI function group. The possible valid values of the number of interruptions are in the range of zero to 2,048, in one example;

Version 758: This field indicates the version of the PCI specification that is supported by the PCI facility to which the group of PCI functions designated by the specified PCI group identifier are attached;

Frame 762: This field indicates the frame (or page) sizes supported for I/O address translation;

Measurement Block Update Interval 764: This is a value indicating the approximate time interval (e.g., in milliseconds) at which the PCI function measurement block is updating;

DMA Address Space Mask 766: This is a value used to indicate which bits in a PCI address are used to identify a DMA address space; and MSI Address 768: This is a value that is to be used for message signal interruption requests.

The query list and function commands described above retrieve information from, for instance, the function table. At initialization time, or after a hot plug of an adapter, firmware performs a bus walk to determine the location of the adapter and determines its basic characteristics. This information is stored by the firmware into the function table entry (FTE) for each adapter. Accessibility to the adapter is determined based on policy set by a system administrator and is also set by firmware into the FTE. The query list and function commands can then retrieve this information and store it in their respective response blocks accessible to the operating system.

Further, the group information is based on a given system I/O infrastructure and the capabilities of the firmware and the I/O hub. This may be stored in the FTE or any other convenient location for later retrieval during the query processing. In particular, the query group command retrieves the information and stores it in its response block accessible to the operating system.

In one example, the group id is used to distinguish between levels of an I/O hub. For example, if a server is upgraded, any newer I/O hubs may have extended capabilities. Thus, PCI functions attached to an older I/O hub might be in group 1, whereas PCI functions attached to the newer I/O hub might be in group 2.

Described in detail herein, is a tiered query facility used to discover an available I/O configuration to the operating system. It is used to discover the adapter functions available to the operating system and information regarding adapter functions. In the first tier, the list command is used to provide a list of the PCI functions available to the operating system. Each list entry represents a PCI function and is indicated by a PCI function handle. Using the handle of a selected PCI function, a second tier query function command is used that is directed to the specified PCI function having that handle. The information returned by the query function includes information that is or may be unique to the specified PCI function. It provides the functional characteristics of the specified PCI function. Further, it may indicate the group of one or more functions to which the specified PCI function belongs. The group ID value provided in this query can then be used in the third tier, a query group command, to determine additional characteristics that are common to any PCI function in the same group. The information obtained from the list and queries is obtained without any knowledge on the part of the operating system of the I/O configuration including whether any adapter functions exist or are accessible to the operating system, nor are any characteristics of the adapters known to the operating system.

In the embodiments described herein, the adapters are PCI adapters. PCI, as used herein, refers to any adapters implemented according to a PCI-based specification as defined by the Peripheral Component Interconnect Special Interest Group (PCI-SIG), including but not limited to, PCI or PCIe. In one particular example, the Peripheral Component Interconnect Express (PCIe) is a component level interconnect standard that defines a bi-directional communication protocol for transactions between I/O adapters and host systems. PCIe communications are encapsulated in packets according to the PCIe standard for transmission on a PCIe bus. Transactions originating at I/O adapters and ending at host systems are referred to as upbound transactions. Transactions originating at host systems and terminating at I/O adapters are referred to as downbound transactions. The PCIe topology is based on point-to-point unidirectional links that are paired (e.g., one upbound link, one downbound link) to form the PCIe bus. The PCIe standard is maintained and published by the PCI-SIG.

Other applications filed on the same day include: U.S. Ser. No. 12/821,170, filed Jun. 23, 2010, entitled "Translation Of Input/Output Addresses To Memory Addresses," Craddock et al., (POU920090029US1); U.S. Ser. No. 12/821,171, filed Jun. 23, 2010, entitled "Runtime Determination Of Translation Formats For Adapter Functions," Craddock et al., (POU920100007US1); U.S. Ser. .No. 12/821,172, filed Jun. 23, 2010, entitled "Resizing Address Spaces Concurrent To Accessing The Address Spaces," Craddock et al., (POU920100009US1); U.S. Ser. No. 12/821,174, filed Jun. 23, 2010, entitled "Multiple Address Spaces Per Adapter," Craddock et al., (POU920100010US1); U.S. Ser. No. 12/821,175, filed Jun. 23, 2010, entitled "Converting A Message Signaled Interruption Into An I/O Adapter Event Notification," Craddock et al., (POU920100014US1); U.S. Ser. No. 12/821,177, filed Jun. 23, 2010, entitled "Converting A Message Signaled Interruption Into An I/O Adapter Event Notification To A Guest Operating System," Brice et al., (POU920100015US1); U.S. Ser. No. 12/821,178, filed Jun. 23, 2010, entitled "Identification Of Types Of Sources Of Adapter Interruptions," Craddock et al., (POU920100016US1); U.S. Ser. No. 12/821,179, filed Jun. 23, 2010, entitled "Controlling A Rate At Which Adapter Interruption Requests Are Processed," Belmar et al., (POU920100017US1); U.S. Ser. No. 12/821,181, filed Jun. 23, 2010, entitled "Controlling The Selectively Setting Of Operational Parameters For An Adapter," Craddock et al., (POU920100018US1); U.S. Ser. No. 12/821,182, filed Jun. 23, 2010, entitled "Load Instruction for Communicating with Adapters," Craddock et al., (POU920100019US1); U.S. Ser. No. 12/821,184, filed Jun. 23, 2010, entitled "Controlling Access By A Configuration To An Adapter Function," Craddock et al., (POU920100020US1); U.S. Ser. No. 12/821,187, filed Jun. 23, 2010, entitled "Enable/Disable Adapters Of A Computing Environment," Coneski et al., (POU920100022US1); U.S. Ser. No. 12/821,190, filed Jun. 23, 2010, entitled "Guest Access To Address Spaces Of Adapter," Craddock et al., (POU920100023US1); U.S. Ser. No 12/821,191, filed Jun. 23, 2010, entitled "Managing Processing Associated With Hardware Events," Coneski et al., (POU920100025US1); U.S. Ser. No. 12/821,192, filed Jun. 23, 2010, entitled "Operating System Notification Of Actions To Be Taken Responsive To Adapter Events," Craddock et al., (POU920100026US1); U.S. Ser. No. 12/821,193, filed Jun. 23, 2010, entitled "Measurement Facility For Adapter Functions," Brice et al., (POU920100027US1); U.S. Ser. No. 12/821,194, filed Jun. 23, 2010,entitled "Store/Store Block Instructions for Communicating with Adapters," Craddock et al., (POU920100162US1); U.S. Ser. No. 12/821,224, filed Jun. 21, 2010, entitled "Associating Input/Output Device Requests With Memory Associated With A Logical Partition," Craddock et al., (POU920100045US1); U.S. Ser. No. 12/821,247, filed Jun. 23, 2010, entitled "Scalable I/O Adapter Function Level Error Detection, Isolation, And Reporting," Craddock et al., (POU920100044US1); U.S. Ser. No. 12/821,256, filed Jun. 23, 2010, entitled "Switch Failover Control In A Multiprocessor Computer System," Bayer et al., (POU920100042US1); U.S. Ser. No. 12/821,242, filed Jun. 23, 2010, entitled "A System And Method For Downbound I/O Expansion Request And Response Processing In A PCIe Architecture," Gregg et al., (POU920100040US1); U.S. Ser. No. 12/821,243, filed Jun. 23, 2010, entitled "Upbound Input/Output Expansion Request And Response Processing In A PCIe Architecture," Gregg et al., (POU920100039US1); U.S. Ser. No. 12/821,245, filed Jun. 23, 2010, entitled "A System And Method For Routing I/O Expansion Requests And Responses In A PCIe Architecture," Lais et al. (POU920100038US1); U.S. Ser. No. 12/821,239, filed Jun. 23, 2010, entitled "Input/Output (I/O) Expansion Response Processing In A Peripheral Component Interconnect Express (PCIe) Environment," Gregg et al., (POU920100037US1); U.S. Ser. No. 12/821,271, filed Jun. 23, 2010, entitled "Memory Error Isolation And Recovery In A Multiprocessor Computer System," Check et al., (POU920100041US1); and U.S. Ser. No. 12/821,248filed Jun. 23, 2010, entitled "Connected Input/Output Hub Management," Bayer et al., (POU920100036US1), each of which is hereby incorporated herein by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
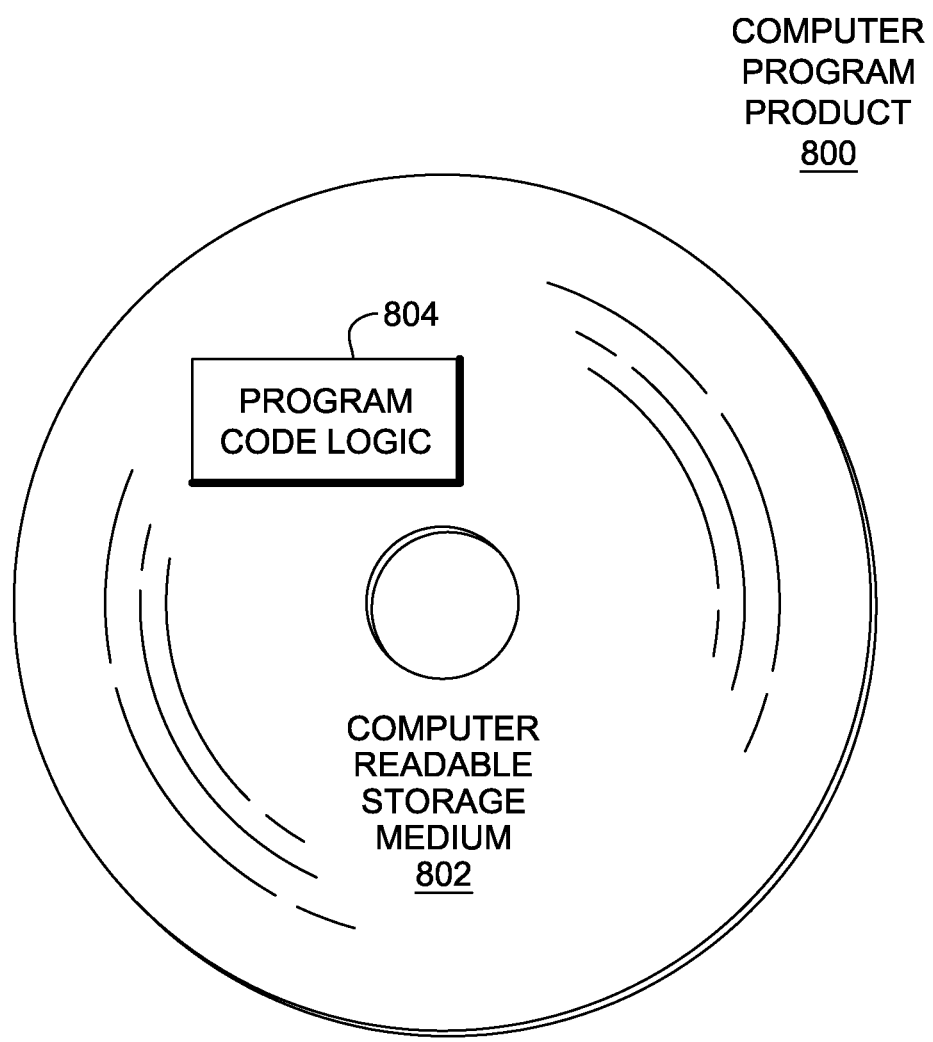
FIG. 8 depicts one embodiment of a computer program product incorporating one or more aspects of the present invention.

Referring now to FIG. 8, in one example, a computer program product 800 includes, for instance, one or more computer readable storage media 802 to store computer readable program code means or logic 804 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z® servers, such as Power Systems servers or other servers offered by International Business Machines Corporation, or servers of other companies can include, use and/or benefit from one or more aspects of the present invention. Further, although in the examples herein, the adapters and PCI hub are considered a part of the server, in other embodiments, they do not have to necessarily be considered a part of the server, but can simply be considered as being coupled to system memory and/or other components of a computing environment. The computing environment need not be a server. Further, the operating system may be an operating system of a specific partition or zone, and thus, the information is obtained for that partition or zone. Further, other software (e.g., other privileged software) may be using one or more aspects of the present invention to obtain the information. Additionally, each request and response block may include more, less or different information, and other types of instructions may be used. Further, in other embodiments, the information is obtained without use of an instruction. Many other variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 9:
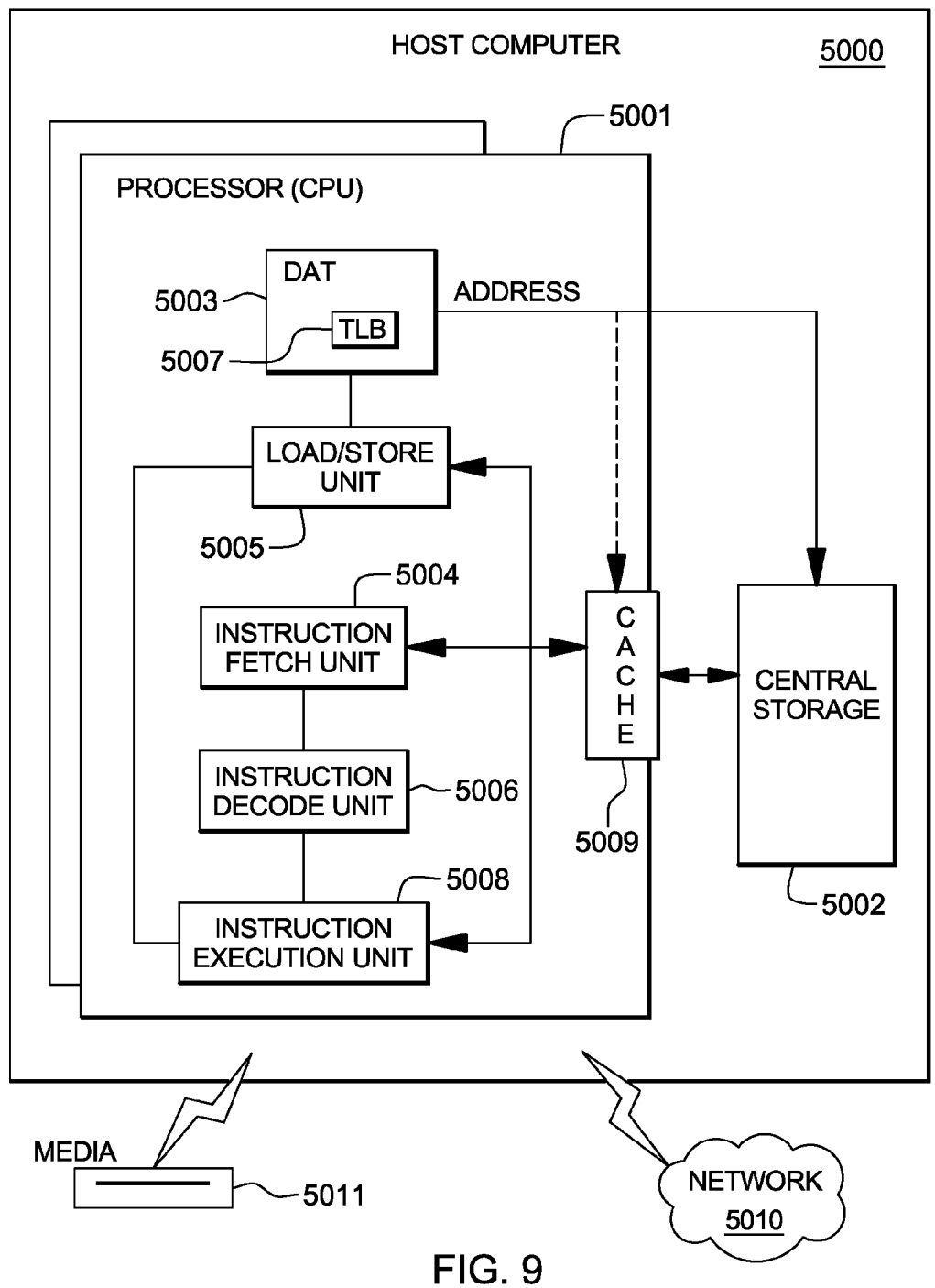
FIG. 9 depicts one embodiment of a host computer system to incorporate and use one or more aspects of the present invention.

Referring to FIG. 9, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 9, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 10:
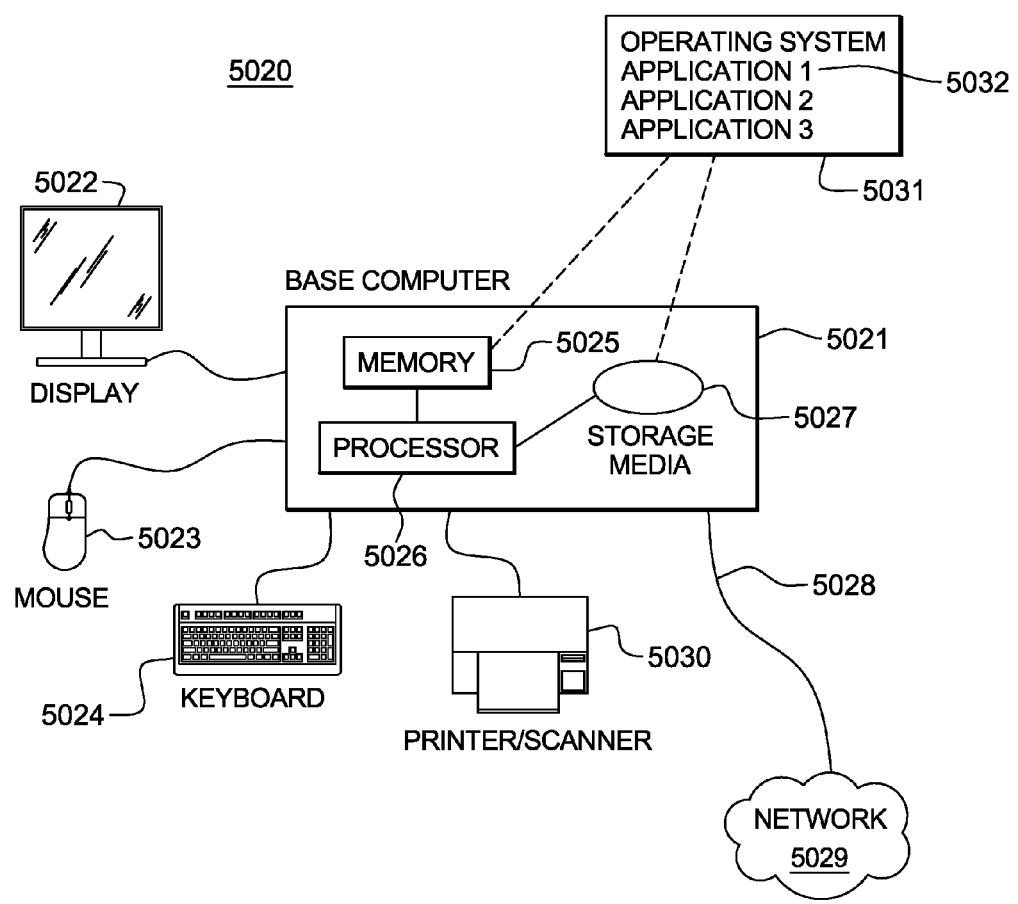
FIG. 10 depicts a further example of a computer system to incorporate and use one or more aspects of the present invention.

FIG. 10 illustrates a representative workstation or server hardware system in which the present invention may be practiced. The system 5020 of FIG. 10 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029.

Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 11:
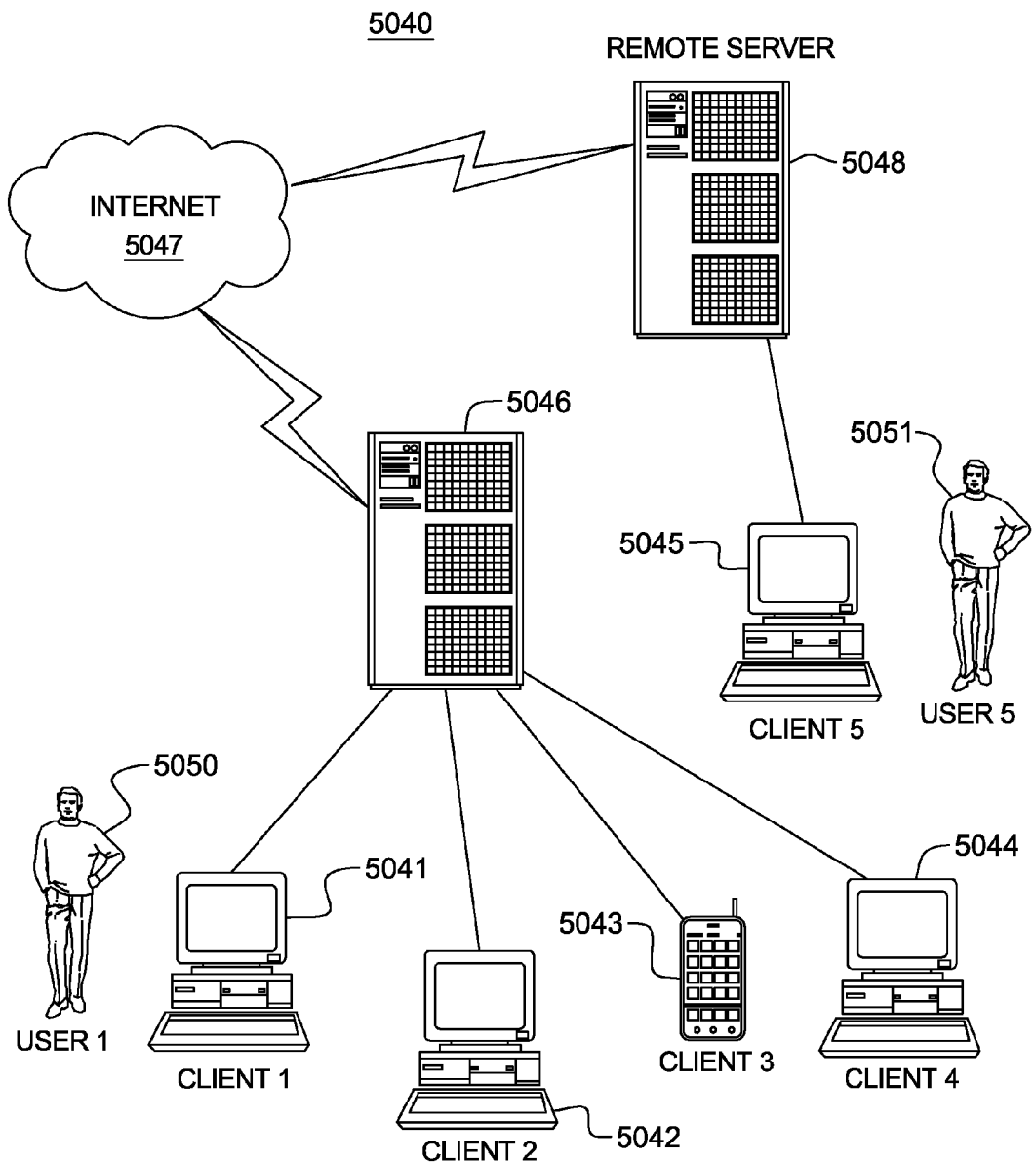
FIG. 11 depicts another example of a computer system comprising a computer network to incorporate and use one or more aspects of the present invention.

FIG. 11 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 11, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 10 and FIG. 11, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 12:
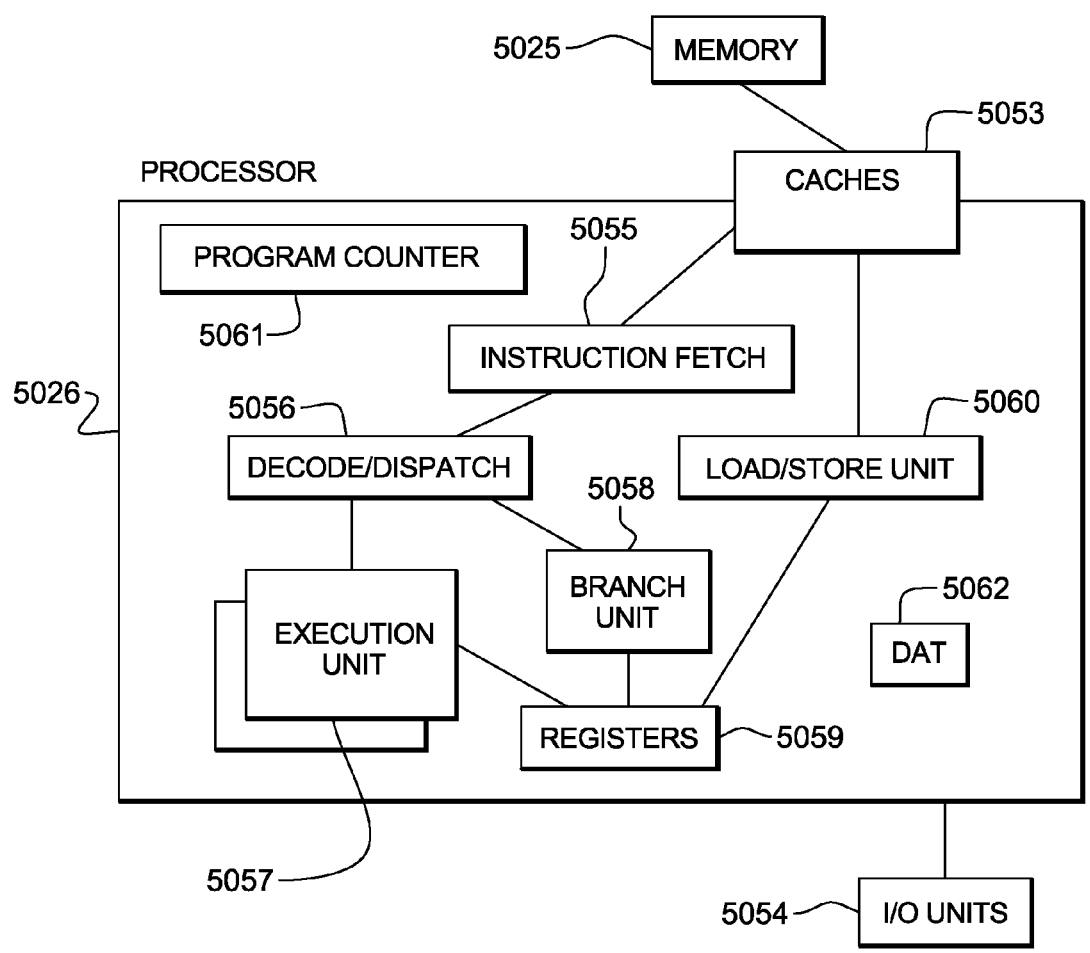
FIG. 12 depicts one embodiment of various elements of a computer system to incorporate and use one or more aspects of the present invention.

Referring to FIG. 12, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 13A:
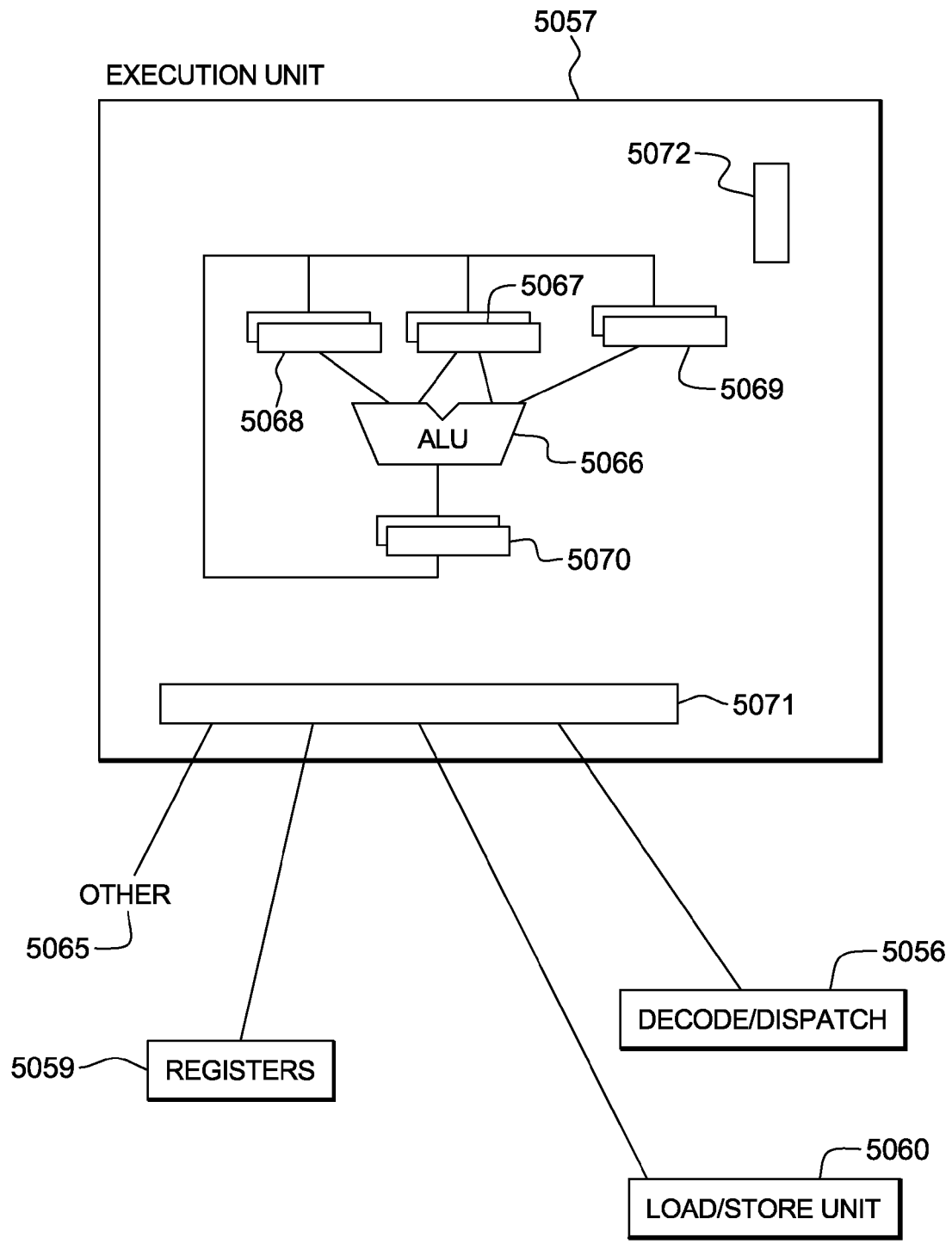
FIG. 13A depicts one embodiment of the execution unit of the computer system of FIG. 12 to incorporate and use one or more aspects of the present invention.

A processor 5026 typically has one or more units 5057, 5058, 5060 for executing the function of the instruction. Referring to FIG. 13A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 13B:
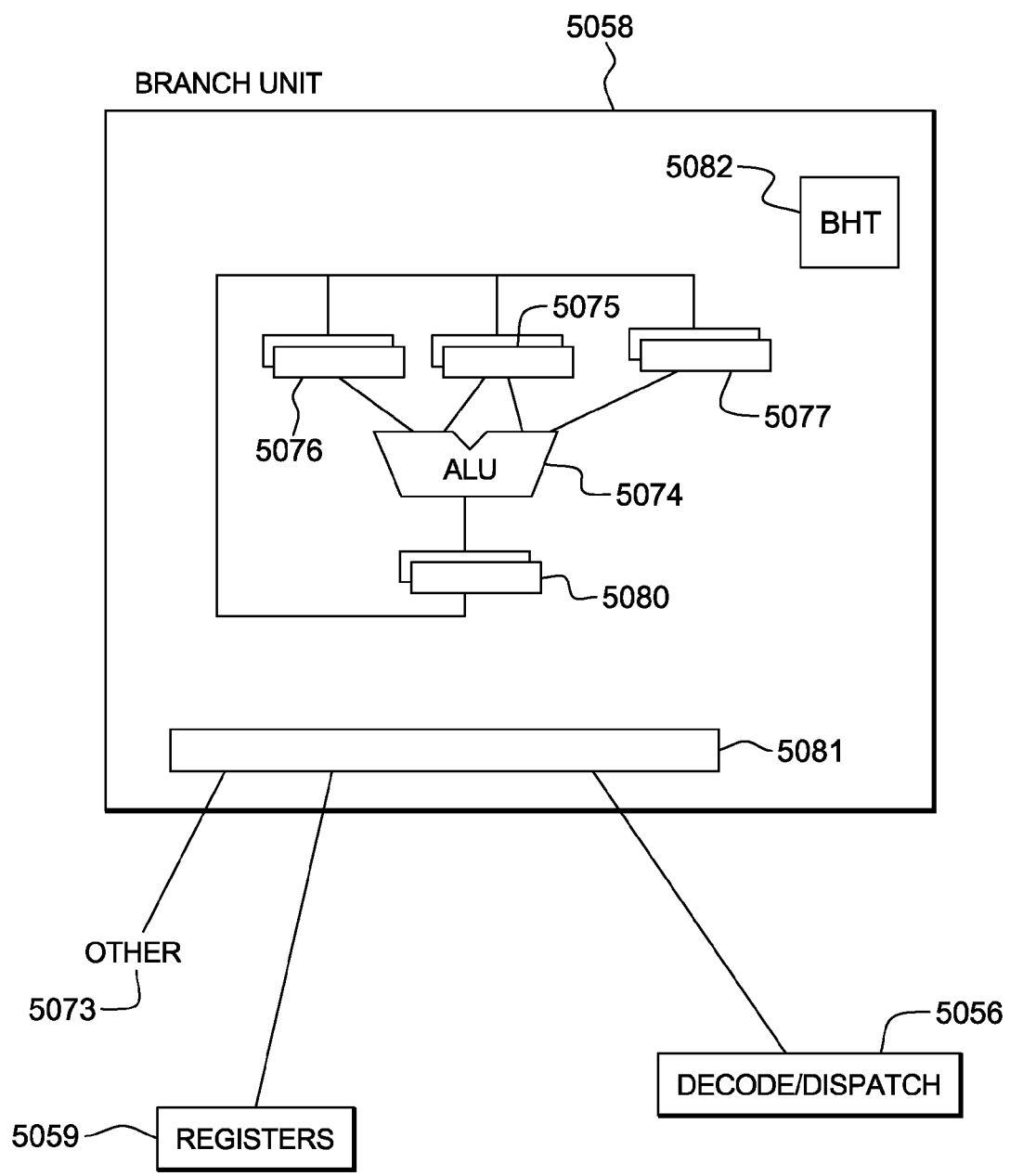
FIG. 13B depicts one embodiment of the branch unit of the computer system of FIG. 12 to incorporate and use one or more aspects of the present invention.

Referring to FIG. 13B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 13C:
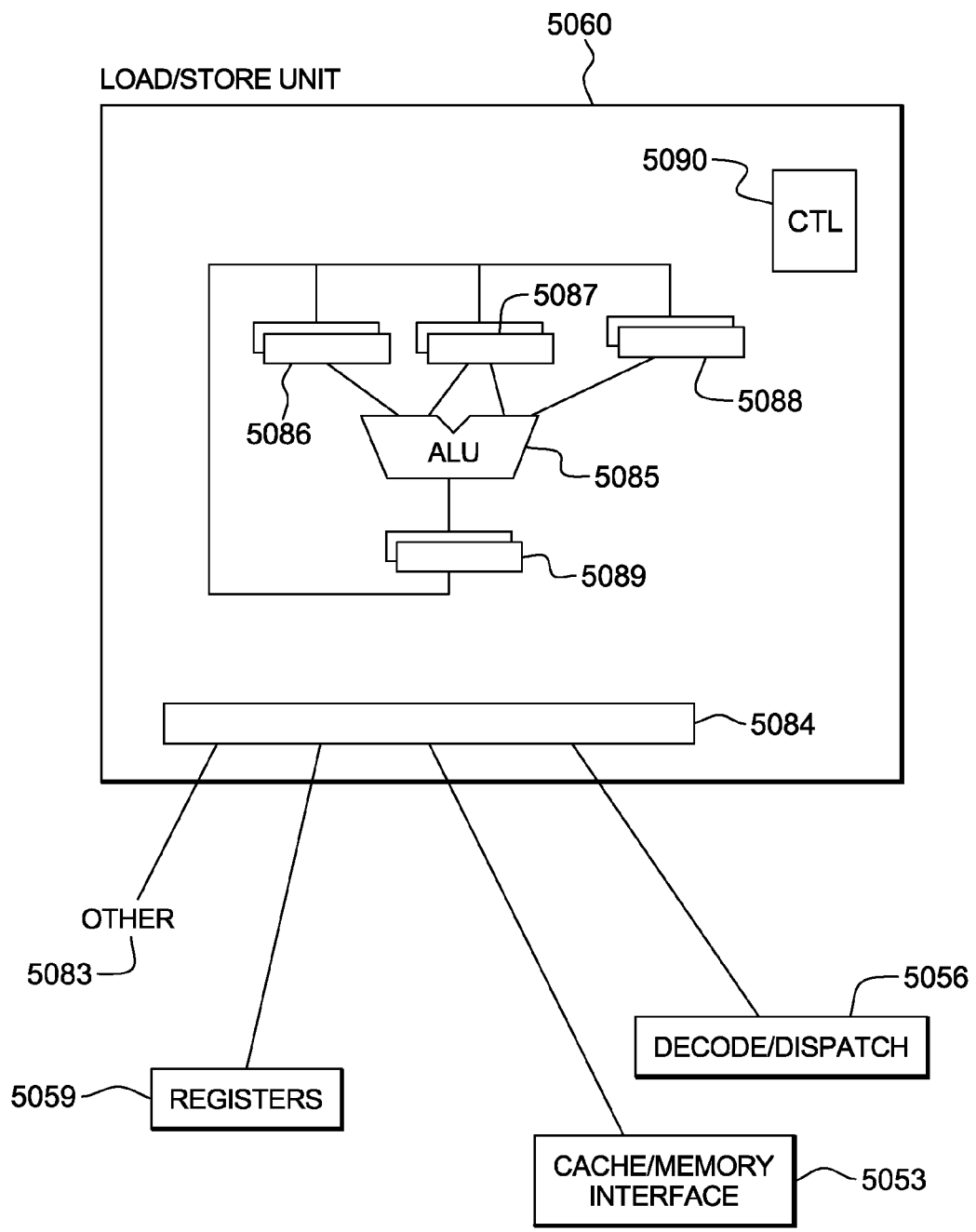
FIG. 13C depicts one embodiment of the load/store unit of the computer system of FIG. 12 to incorporate and use one or more aspects of the present invention.

Referring to FIG. 13C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multiprocessor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 12) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 14:
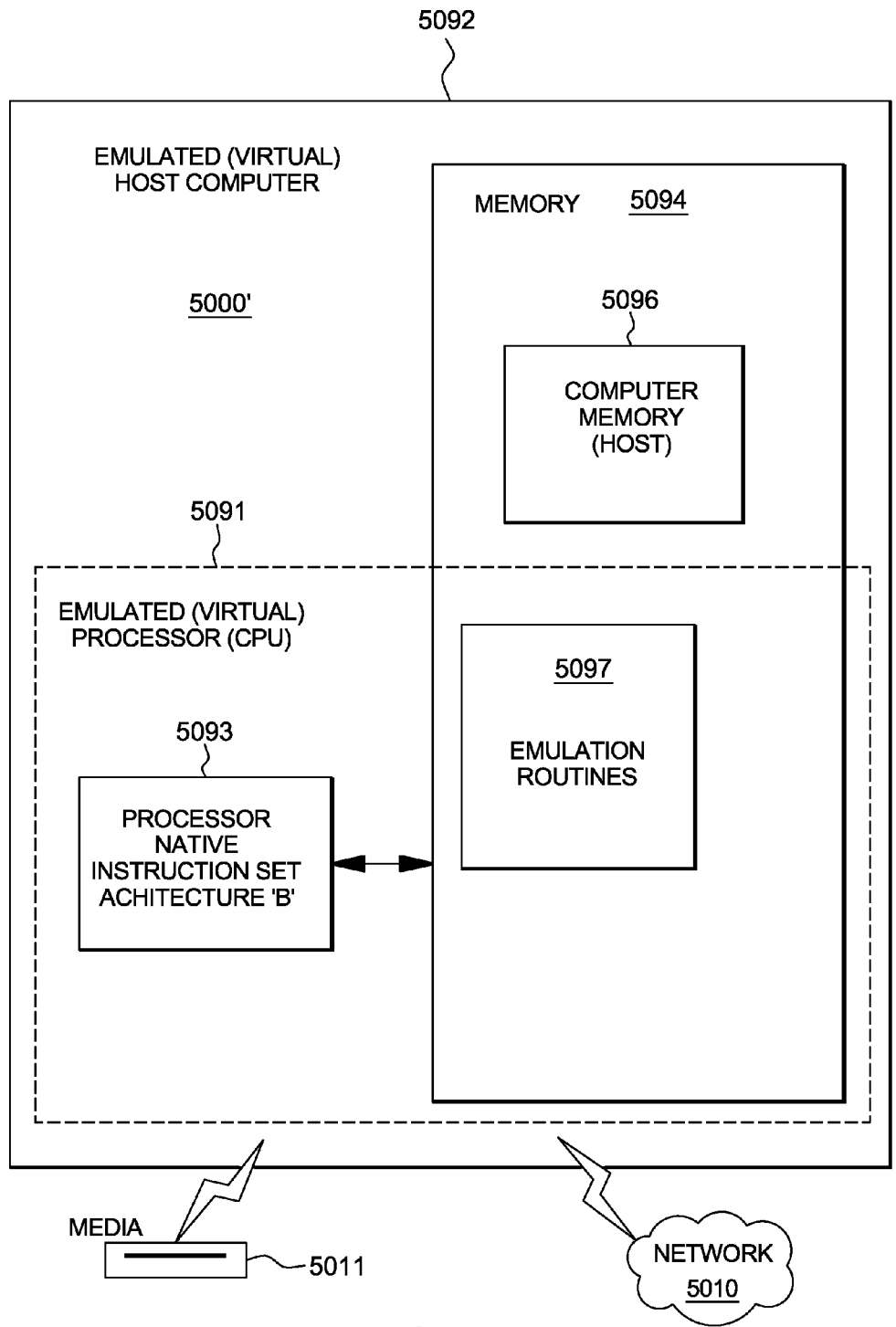
FIG. 14 depicts one embodiment of an emulated host computer system to incorporate and use one or more aspects of the present invention.

In FIG. 14, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for obtaining input/output (I/O) hardware information, said computer program product comprising:
    a non-transitory computer readable storage medium readable by a processing circuit and storing instructions for execution by the processing circuit for performing a method comprising:
    providing to an operating system an indication of one or more adapter functions accessible to the operating system, the providing comprising:
        obtaining, by a processor of a computing environment, a list of one or more adapter functions of an I/O configuration accessible to the operating system, said list including one or more function handles corresponding to the one or more adapter functions; and
        using a function handle of the one or more function handles to obtain one or more attributes regarding the adapter function identified by the function handle, the function handle usable by one or more instructions to access the adapter function corresponding to the function handle, and wherein the function handle includes an enable indicator to indicate whether the function handle associated with the adapter function is enabled, a function number to be used to access a data structure to obtain at least one attribute of the one or more attributes, and an instance number to indicate a particular instance of the function handle.

2. The computer program product of claim 1, wherein the one or more attributes includes a group identifier identifying a group of one or more adapter functions that includes the adapter function, wherein the one or more adapter functions of the group have one or more common characteristics, and wherein the group identifier is used to distinguish between levels of an I/O hub coupled to the one or more adapter functions.

3. The computer program product of claim 2, wherein the one or more common characteristics comprise at least one of a number of interruptions allowed for the one or more adapter functions of the group, a measurement block update interval indicating how often measurement data is to be obtained for the one or more adapter functions of the group, an indication of which portion of an address provided by an adapter function of the group is to identify an address space accessible by the one or more adapter functions of the group, or an interrupt address usable by the one or more adapter functions.

4. The computer program product of claim 1, wherein the one or more attributes include at least one of a function group identifier to identify a group of one or more adapter functions to which this adapter function belongs, a function identifier of the adapter function, a physical indicator indicating a physical location of the adapter function, one or more base address registers for the adapter function, one or more size indicators specifying one or more address space sizes for the adapter function, or an indication of the beginning and end of an address space available to the adapter function.

5. The computer program product of claim 1, wherein the data structure comprises a function table, and wherein the function handle is used to locate a function table entry of the function table, the function table entry providing one or more indicators for its associated adapter function.

6. The computer program product of claim 1, wherein the obtaining comprises obtaining the list absent performing by an operating system executing within the processor a bus walk of the I/O configuration, and wherein the operating system is absent knowledge of an adapter configuration topology of adapter functions of the computing environment.

7. The computer program product of claim 1, wherein the obtaining comprises obtaining a partial list of adapter functions accessible to the operating system, and wherein the method further comprises resuming the obtaining one or more times to obtain a complete list of adapter functions accessible to the operating system.

8. The computer program product of claim 7, wherein the obtaining is based on execution of an instruction, and wherein the instruction employs a request control block, said request control block comprising a resume indicator indicating whether the obtaining is a continuation of a previous obtaining of the list of adapter functions.

9. The computer program product of claim 1, wherein at least an indication of the list is provided in a response control block received by the processor, and wherein the response control block further includes at least one of a resume token indicating whether the obtaining of the list is to be continued or whether a complete list has been obtained, an indication of a number of adapter functions supported by the I/O configuration, or a size indicator specifying a size of each entry in the list.

10. The computer program product of claim 1, wherein the list of one or more adapter functions comprises one or more entries, and each entry includes at least one of an identifier of an adapter associated with the adapter function corresponding to the entry, an identifier of a manufacturer of the adapter, an identifier of the adapter function, the function handle, or a configuration state indicator.

11. A computer system for obtaining input/output (I/O) hardware information, said computer system comprising:
a memory; and
a processor in communications with the memory, wherein the computer system is configured to perform a method, said method comprising:
providing to an operating system an indication of one or more adapter functions accessible to the operating system, the providing comprising:
obtaining, by a processor of a computing environment, a list of one or more adapter functions of an I/O configuration accessible to the operating system, said list including one or more function handles corresponding to the one or more adapter functions; and
using a function handle of the one or more function handles to obtain one or more attributes regarding the adapter function identified by the function handle, the function handle usable by one or more instructions to access the adapter function corresponding to the function handle, and wherein the function handle includes an enable indicator to indicate whether the function handle associated with the adapter function is enabled, a function number to be used to access a data structure to obtain at least one attribute of the one or more attributes, and an instance number to indicate a particular instance of the function handle.

12. The computer system of claim 11, wherein the one or more attributes includes a group identifier identifying a group of one or more adapter functions that includes the adapter function, wherein the one or more adapter functions of the group have one or more common characteristics, and wherein the group identifier is used to distinguish between levels of an I/O hub coupled to the one or more adapter functions.

13. The computer system of claim 12, wherein the one or more common characteristics comprise at least one of a number of interruptions allowed for the one or more adapter functions of the group, a measurement block update interval indicating how often measurement data is to be obtained for the one or more adapter functions of the group, an indication of which portion of an address provided by an adapter function of the group is to identify an address space accessible by the one or more adapter functions of the group, or an interrupt address usable by the one or more adapter functions.

14. The computer system of claim 11, wherein the one or more attributes include at least one of a function group identifier to identify a group of one or more adapter functions to which this adapter function belongs, a function identifier of the adapter function, a physical indicator indicating a physical location of the adapter function, one or more base address registers for the adapter function, one or more size indicators specifying one or more address space sizes for the adapter function, or an indication of the beginning and end of an address space available to the adapter function.

15. The computer system of claim 11, wherein the obtaining comprises obtaining the list absent performing by an operating system executing within the processor a bus walk of the I/O configuration, and wherein the operating system is absent knowledge of an adapter configuration topology of adapter functions of the computing environment.

16. The computer system of claim 11, wherein the obtaining comprises obtaining a partial list of adapter functions accessible to the operating system, and wherein the method further comprises resuming the obtaining one or more times to obtain a complete list of adapter functions accessible to the operating system.

17. The computer system of claim 11, wherein at least an indication of the list is provided in a response control block received by the processor, and wherein the response control block further includes at least one of a resume token indicating whether the obtaining of the list is to be continued or whether a complete list has been obtained, an indication of a number of adapter functions supported by the I/O configuration, or a size indicator specifying a size of each entry in the list.

18. A method of obtaining input/output (I/O) hardware information, said method comprising:
providing to an operating system an indication of one or more adapter functions accessible to the operating system, the providing comprising:
obtaining, by a processor of a computing environment, a list of one or more adapter functions of an I/O configuration accessible to the operating system, said list including one or more function handles corresponding to the one or more adapter functions; and
using a function handle of the one or more function handles to obtain one or more attributes regarding the adapter function identified by the function handle, the function handle usable by one or more instructions to access the adapter function corresponding to the function handle, and wherein the function handle includes an enable indicator to indicate whether the function handle associated with the adapter function is enabled, a function number to be used to access a data structure to obtain at least one attribute of the one or more attributes, and an instance number to indicate a particular instance of the function handle.

19. The method of claim 18, wherein the one or more attributes includes a group identifier identifying a group of one or more adapter functions that includes the adapter function, wherein the one or more adapter functions of the group have one or more common characteristics, and wherein the group identifier is used to distinguish between levels of an I/O hub coupled to the one or more adapter functions.

20. The method of claim 18, wherein the obtaining comprises obtaining a partial list of adapter functions accessible to the operating system, and wherein the method further comprises resuming the obtaining one or more times to obtain a complete list of adapter functions accessible to the operating system.

21. The computer program product of claim 2, wherein the one or more common characteristics comprises a number of interruptions allowed for the one or more adapter functions of the group.

22. The computer program product of claim 2, wherein the one or more common characteristics comprises a measurement block update interval indicating how often measurement data is to be obtained for the one or more adapter functions of the group.

23. The computer program product of claim 1, wherein the one or more adapter functions include one or more Peripheral Component Interconnect (PCI) functions of a PCI adapter, and wherein the function handle is used to obtain at least one starting address of at least one address space within the PCI adapter.

* * * * *